United States Patent
Harada

(10) Patent No.: US 11,254,384 B2
(45) Date of Patent: Feb. 22, 2022

(54) VEHICLE LAMP

(71) Applicant: KOITO MANUFACTURING CO., LTD., Tokyo (JP)

(72) Inventor: Hiroyuki Harada, Shizuoka (JP)

(73) Assignee: KOITO MANUFACIURING CO., LTD., Tokyo (JP)

( * ) Notice: Subject to any disclaimer, the term of this patent is extended or adjusted under 35 U.S.C. 154(b) by 0 days.

(21) Appl. No.: 16/640,774

(22) PCT Filed: Jun. 12, 2018

(86) PCT No.: PCT/JP2018/022376
§ 371 (c)(1),
(2) Date: Feb. 21, 2020

(87) PCT Pub. No.: WO2019/039051
PCT Pub. Date: Feb. 28, 2019

(65) Prior Publication Data
US 2021/0114678 A1    Apr. 22, 2021

(30) Foreign Application Priority Data

Aug. 24, 2017    (JP) .............................. JP2017-161187
Aug. 24, 2017    (JP) .............................. JP2017-161188

(51) Int. Cl.
*B62J 6/023*    (2020.01)
*F21S 41/675*   (2018.01)
(Continued)

(52) U.S. Cl.
CPC .............. *B62J 6/023* (2020.02); *B60Q 1/122* (2013.01); *F21S 41/663* (2018.01); *F21S 41/675* (2018.01); *F21W 2102/155* (2018.01)

(58) Field of Classification Search
CPC ........ B60Q 1/10–16; F21S 41/60–698; F21W 2102/155
(Continued)

(56) References Cited

U.S. PATENT DOCUMENTS 8,912,722 B2 * 12/2014 Ooba .......................... B62J 6/02
                                                          315/82
9,689,549 B2 *  6/2017 Suwa ....................... F21S 41/26
(Continued)

FOREIGN PATENT DOCUMENTS

CN    202158503 U    3/2012
CN    103318310 A    9/2013
(Continued)

OTHER PUBLICATIONS

Written Opinion (PCT/ISA/237) issued by the International Searching Authority in corresponding International Application No. PCT/JP2018/022376, dated Aug. 28, 2018.
(Continued)

*Primary Examiner* — Jason M Han
(74) *Attorney, Agent, or Firm* — Sughrue Mion, PLLC

(57) ABSTRACT

This vehicular lighting equipment provided on a vehicle (100), which is capable of travelling around a corner by tilting the vehicle body toward the turning direction, comprises a light source, an optical member by which the light emitted from the light source is directed forward from the lighting equipment to form a predetermined light distribution pattern (PL), and a control unit for adjusting the predetermined light distribution pattern (PL) according to the tilted state of the vehicle body. The control unit is configured to adjust a predetermined light distribution pattern (PL2) such that in a light distribution pattern (PL1) corresponding to when the vehicle body is tilted, no light is irradiated in a region located outside the light distribution
(Continued)

pattern (PL) corresponding to when the vehicle body is in the vertical state.

12 Claims, 20 Drawing Sheets

(51) Int. Cl.
  *F21S 41/663* (2018.01)
  *B60Q 1/12* (2006.01)
  *F21W 102/155* (2018.01)

(58) Field of Classification Search
  USPC ......... 362/465–468, 473–476, 508, 523–527
  See application file for complete search history.

(56) References Cited

U.S. PATENT DOCUMENTS

| | | | |
|---|---|---|---|
| 2013/0241413 A1 | 9/2013 | Ooba et al. | |
| 2014/0268837 A1 | 9/2014 | Simchak et al. | |
| 2015/0204504 A1 | 7/2015 | Suwa et al. | |
| 2015/0267888 A1* | 9/2015 | Suwa | B62J 6/02 362/512 |
| 2016/0290583 A1 | 10/2016 | Suwa et al. | |
| 2016/0369966 A1 | 12/2016 | Kuwata et al. | |
| 2018/0187850 A1 | 7/2018 | Suwa et al. | |
| 2019/0203895 A1 | 7/2019 | Suwa et al. | |

FOREIGN PATENT DOCUMENTS

| | | | | |
|---|---|---|---|---|
| CN | 104235719 | A | 12/2014 | |
| CN | 104235722 | A | 12/2014 | |
| CN | 104344308 | A | 2/2015 | |
| CN | 105745488 | A | 7/2016 | |
| CN | 106500039 | A | 3/2017 | |
| CN | 106322272 | A | 7/2017 | |
| DE | 20 2012 004 965 | U1 | 8/2012 | |
| DE | 10 2016 107 233 | A1 | 10/2016 | |
| DE | 10 2016 111 578 | A1 | 1/2017 | |
| EP | 1645466 | A1 | 4/2006 | |
| EP | 2 894 086 | A1 | 7/2015 | |
| JP | 9-277974 | A | 10/1997 | |
| JP | 2006131212 | A | 5/2006 | |
| JP | 2009-101887 | A | 5/2009 | |
| JP | 2016-203653 | A | 12/2016 | |
| JP | 2017-100500 | A | 6/2017 | |
| WO | 2014038177 | A1 | 3/2014 | |
| WO | 2015022848 | A1 | 2/2015 | |
| WO | WO-2016006138 | A1 * | 1/2016 | .............. F21S 41/27 |
| WO | 2018/229405 | A1 | 12/2018 | |

OTHER PUBLICATIONS

International Search Report (PCT/ISA/210), issued by International Searching Authority in corresponding International Application No. PCT/JP2018/022376, dated Aug. 28, 2018.
Extended European Search Report dated Apr. 7, 2021, issued by the European Patent Office in counterpart European patent Application No. 18849003.1.
Communication dated Sep. 15, 2021 issued by the State Intellectual Property Office of P.R. China English in counterpart Chinese Application No. 201880054360.6.
Communication dated May 18, 2021, from the China National Intellectual Property Administration in Application No. 201880054360.6.

* cited by examiner

VEHICLE LAMP

TECHNICAL FIELD

The present disclosure relates to a vehicle lamp.

BACKGROUND ART

A headlamp for a two-wheeled vehicle is known in PTL 1 and the like.

CITATION LIST

Patent Literature

PTL 1: JP-A-2017-100500

SUMMARY OF INVENTION

Technical Problem

In the case of the two-wheeled vehicle, when turning left or right, a passenger drives the vehicle around a corner while moving a center of gravity to tilt a vehicle body toward a turning direction and to increase a bank angle. At this time, since a light distribution pattern formed by the headlamp is also tilted from a horizontal direction in conjunction with a change in bank angle of the vehicle body, an amount of light is insufficient and far visibility is lowered on a side in the turning direction, in some cases.

It is therefore an object of the present invention to provide a vehicle lamp capable of forming an appropriate light distribution pattern, irrespective of a tilted state of a vehicle.

Solution to Problem

In order to achieve the above object a vehicle lamp of the present invention is a vehicle lamp provided on a vehicle capable of traveling around a corner by titling a vehicle body toward a turning direction. The vehicle lamp includes:

a light source, an optical member configured to form a predetermined light distribution pattern by irradiating light, which is to be emitted from the light source, toward a region ahead of the lamp, and a control unit configured to adjust the predetermined light distribution pattern according to a tilted state of the vehicle body, wherein the control unit is configured to adjust the predetermined light distribution pattern so that in a light distribution pattern corresponding to when the vehicle body is tilted, no light is irradiated in a region located outside a light distribution pattern corresponding to when the vehicle body is in a vertical state.

According to the vehicle lamp, for example, even when the vehicle, which is an automatic two-wheeled vehicle, is traveling with being tilted leftward or rightward, it is possible to form an appropriate light distribution pattern. Thereby, for example, it is possible to improve the safety in assisting the driving.

The predetermined light distribution pattern may include a low beam light distribution pattern having a cutoff line, and the control unit may be configured to adjust the low beam light distribution pattern so that the cutoff line is to be maintained in a horizontal direction even when the vehicle body is tilted.

According to the above configuration, even when the vehicle is traveling with the vehicle body being tilted, it is possible to maintain the low beam light distribution pattern at an appropriate irradiation angle.

The predetermined light distribution pattern may include a high beam light distribution pattern, the high beam light distribution pattern may include a non-irradiation region in which the light is not irradiated to a part corresponding to a target object around the vehicle, and the control unit may be configured to adjust the high beam light distribution pattern so that the non-irradiation region continues to be arranged in the part corresponding to the target object even when the vehicle body is tilted.

According to the above configuration, even when the vehicle is traveling with the vehicle body being tilted, it is possible to appropriately maintain the non-irradiation region of the high beam light distribution pattern. For this reason, it is possible to securely avoid a glare to drivers of a preceding traveling vehicle and an oncoming vehicle.

The light source may be configured by a plurality of light-emitting elements arranged in parallel, and the control unit may be configured to adjust the predetermined light distribution pattern by controlling lighting/lights-out of the plurality of light-emitting elements.

The above configuration is adopted as a specific example of the light source, so that the light distribution pattern can be easily adjusted.

The optical member may be configured by at least one of a rotary reflector, a Galvano mirror, a MEMS mirror, and a polygon mirror, and the control unit may be configured to adjust the predetermined light distribution pattern by controlling a scanning direction of the light with at least one of the rotary reflector, the Galvano mirror, the MEMS mirror, and the polygon mirror.

Any one of the above configurations is adopted as a specific example of the optical member, so that the light distribution pattern can be easily adjusted.

A sensor for detecting the tilted state of the vehicle body may be further provided.

According to the above configuration, it is possible to appropriately reflect detection information about the tilted state of the vehicle body in the formation of the light distribution pattern by the vehicle lamp.

Also, in order to achieve the above object, a vehicle lamp of the present invention is a vehicle lamp provided on a vehicle capable of traveling around a corner by titling a vehicle body toward a turning direction. The vehicle lamp includes:

a light source, an optical member configured to form a predetermined light distribution pattern by irradiating light, which is to be emitted from the light source, toward a region ahead of the lamp, and a correction mechanism configured to correct at least one of an angle and a position of the optical member according to the tilted state of the vehicle body, wherein the optical member includes at least a projector lens.

According to the vehicle lamp, for example, even when the vehicle, which is an automatic two-wheeled vehicle, is traveling with being tilted leftward or rightward, it is possible to form an appropriate light distribution pattern. Thereby, for example, it is possible to improve the safety in assisting the driving.

The predetermined light distribution pattern may include at least one of a low beam light distribution pattern having a cutoff line, and a high beam light distribution pattern, and the correction mechanism may be configured to correct the angle of the optical member so that, even when the vehicle is tilted, a longitudinal direction of the cutoff line of the low beam light distribution pattern or the high beam light distribution pattern is to be maintained along a horizontal direction.

According to the above configuration, it is possible to easily provide an appropriate light distribution by correcting a direction of the cutoff line of the light distribution pattern, for example.

The optical member may further include a reflecting body, and the correction mechanism may be configured to correct the angle by rotating at least one of the projector lens and the reflecting body.

The optical member may further include a reflecting body, and the correction mechanism may be configured to correct the position by changing relative positions of the projector lens and the reflecting body.

According to the above configuration, it is not necessary to provide an additional reflecting member for changing the light distribution pattern and an additional lamp for forming an additional light distribution pattern, so that it is possible to downsize the vehicle lamp and to reduce the number of components thereof.

The reflecting body may be configured by at least one of a rotary reflector, a Galvano mirror, a MEMS mirror, and a polygon mirror.

Any one of the above configurations is adopted as a specific example of the reflecting body, so that the light distribution pattern can be easily adjusted.

A sensor for detecting the tilted state of the vehicle body may be further provided.

According to the above configuration, it is possible to appropriately reflect detection information about the tilted state of the vehicle body in the formation of the light distribution pattern by the vehicle lamp.

Advantageous Effects of Invention

According to the present invention, it is possible to provide the vehicle lamp capable of forming an appropriate light distribution pattern, irrespective of the tilted state of the vehicle.

DESCRIPTION OF EMBODIMENTS

Embodiments of the present invention will be described with reference to the drawings. Meanwhile, in the embodiments, "the right and left direction", "the front and rear direction", and "the upper and lower direction" refer to relative directions set to a vehicle 100 of FIG. 1 for convenience of descriptions.

Figure 1:
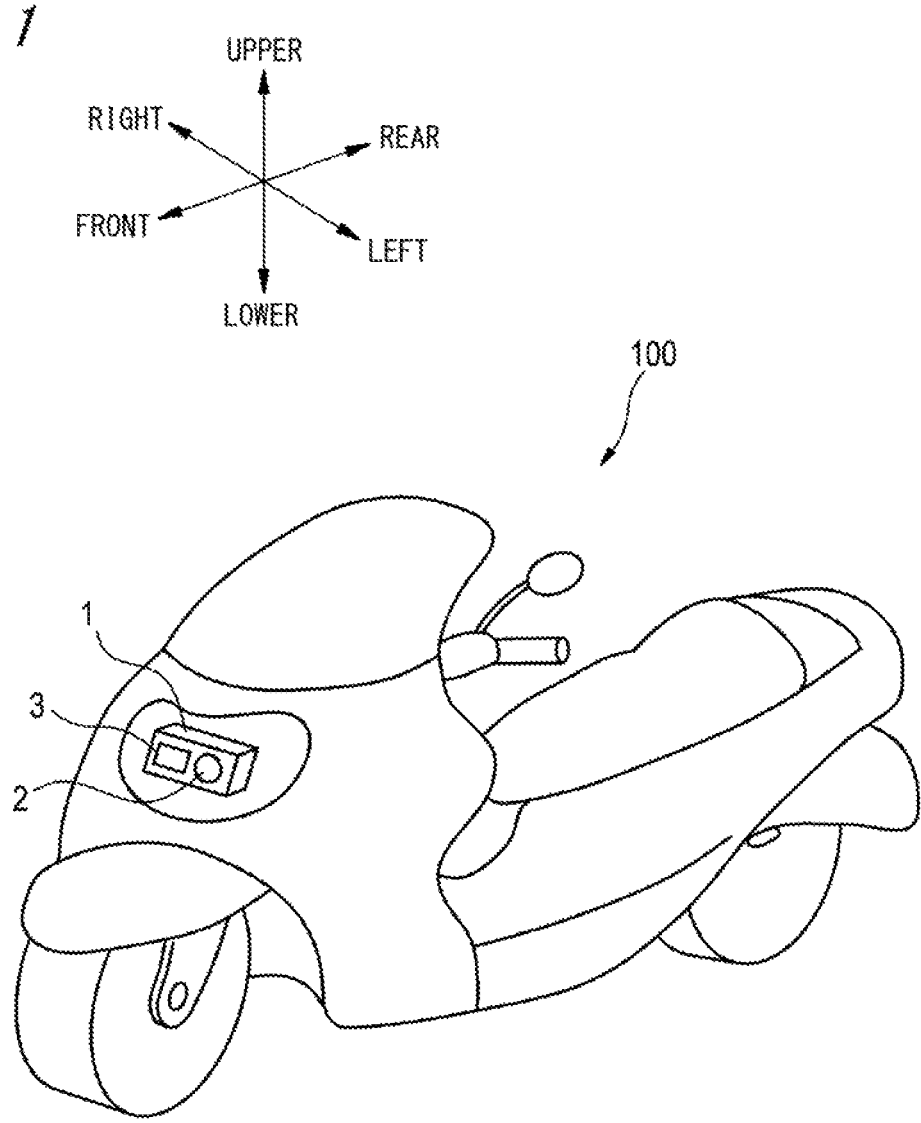
FIG. 1 is a perspective view of a vehicle having a headlamp (vehicle lamp) in accordance with an embodiment of the present invention.

FIG. 1 depicts an automatic two-wheeled vehicle, which is an example of a vehicle 100 of the present embodiment. The automatic two-wheeled vehicle 100 is a vehicle capable of traveling around a corner (curve) of a road by tilting a vehicle body toward a turning direction. The vehicle of the present embodiment may be any vehicle capable of traveling around a corner by tilting a vehicle body toward a turning direction, like the automatic two-wheeled vehicle 100, and the number of wheels thereof is not limited. Therefore, for example, an automatic three-wheeled vehicle, an automatic four-wheeled vehicle and the like are also included in the vehicle of the present embodiment, inasmuch as they can travel in the same manner as the automatic two-wheeled vehicle 100.

As shown in FIG. 1, the automatic two-wheeled vehicle 100 is mounted on its front part with a headlamp 1 (an example of a vehicle lamp) capable of illuminating a region ahead of the vehicle. The headlamp 1 includes a low beam lamp unit 2, and a high beam lamp unit 3. In the present embodiment, the automatic two-wheeled vehicle 100 having one headlamp 1 is exemplified. However, for example, an automatic two-wheeled vehicle having headlamps at both left and right sides is also possible.

Figure 2:
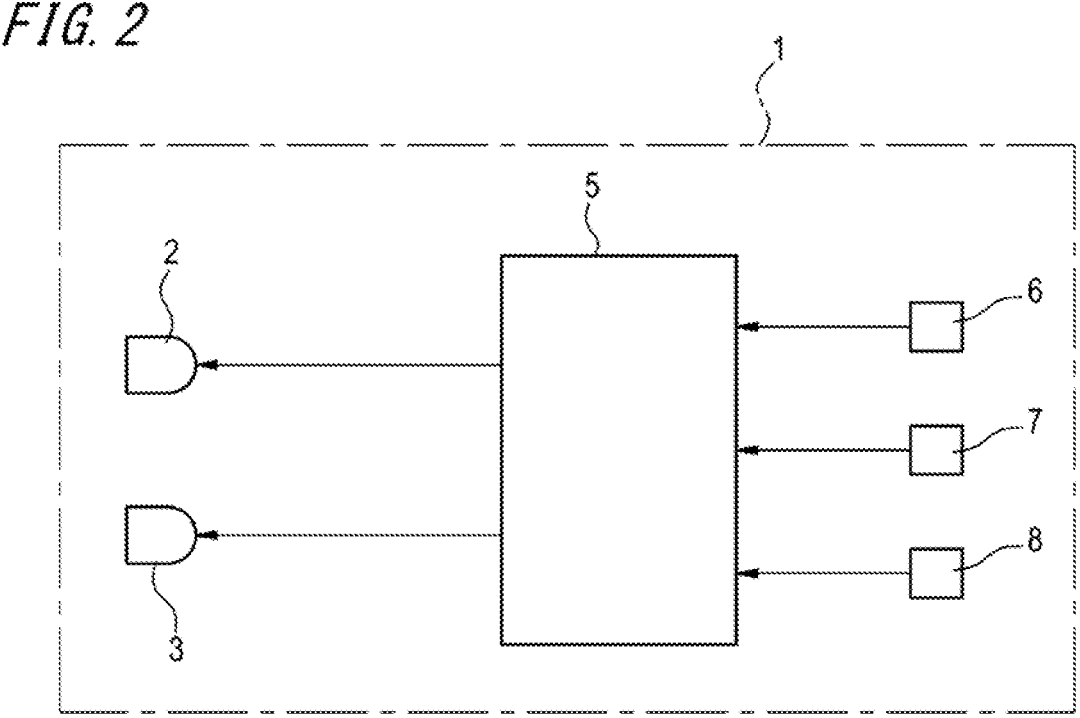
FIG. 2 is a block diagram of the headlamp shown in FIG. 1.

As shown in FIG. 2, the headlamp 1 includes a lamp control unit 5 configured to control operations of the low beam lamp unit 2 and the high beam lamp unit 3. The lamp control unit 5 is connected with the low beam lamp unit 2 and the high beam lamp unit 3, and is also connected with a bank angle sensor 6 (an example of a sensor) configured to detect a tilted state of the automatic two-wheeled vehicle 100 and an external sensor 7 (an example of a sensor) configured to detect environment information outside the vehicle. Also, the lamp control unit 5 is connected with a speed sensor 8 for detecting a speed of the automatic two-wheeled vehicle 100, and the like.

The bank angle sensor 6 is a sensor capable of detecting a tilt angle when the vehicle body of the automatic two-wheeled vehicle 100 is tilted leftward or rightward with respect to a vertical line. The bank angle sensor 6 is, for example, a gyro sensor. In the meantime, the tilt angle of the vehicle body may be calculated on the basis of an image captured by a camera mounted on the vehicle body of the automatic two-wheeled vehicle 100.

The external sensor 7 is a sensor capable of acquiring information outside a host vehicle, including surrounding environments of the automatic two-wheeled vehicle 100 (for example, an obstacle, other vehicles (a preceding traveling vehicle, and an oncoming vehicle), a pedestrian, a road shape, a traffic mark, and the like). The external sensor 7 is configured by at least one of a LiDAR (Light Detection and Ranging or Laser Imaging Detection and Ranging), a camera, a radar and the like, for example.

The respective information detected by the bank angle sensor 6, the external sensor 7 and the speed sensor 8 is transmitted to the lamp control unit 5. The lamp control unit 5 is configured to control operations of the low beam lamp unit 2 and the high beam lamp unit 3, based on the information transmitted from the respective sensors 6 to 8. For example, the lamp control unit 5 can adjust light distribution patterns (a low beam light distribution pattern and a high beam light distribution pattern) to be formed in a region ahead of the vehicle by controlling the headlamp 1 (the low beam lamp unit 2 and the high beam lamp unit 3), based on the detection information from the respective sensors.

First Embodiment

Figure 3:
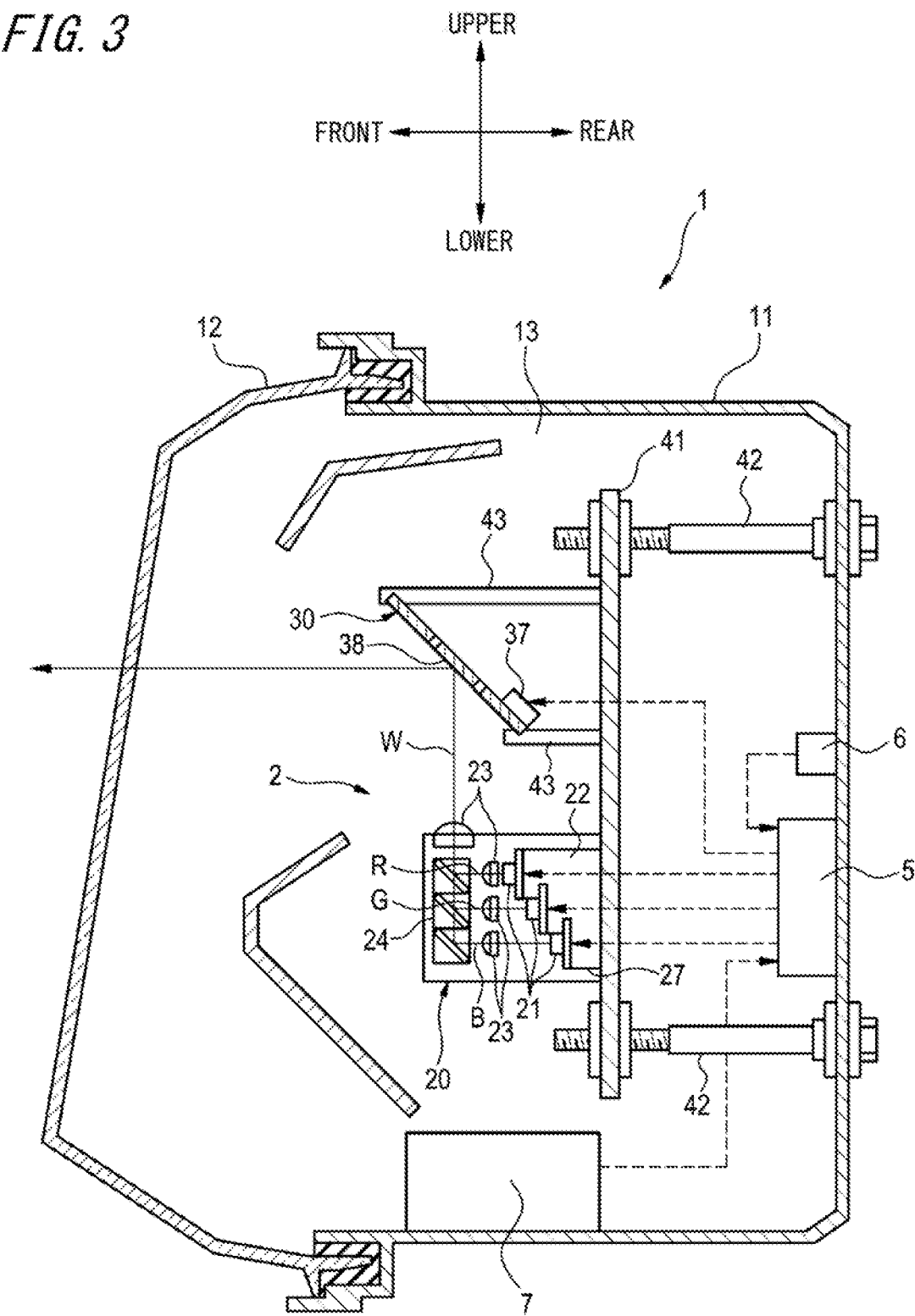
FIG. 3 is a vertical sectional view depicting a configuration of a low beam lamp unit provided to the headlamp in accordance with a first embodiment.
Figure 10:
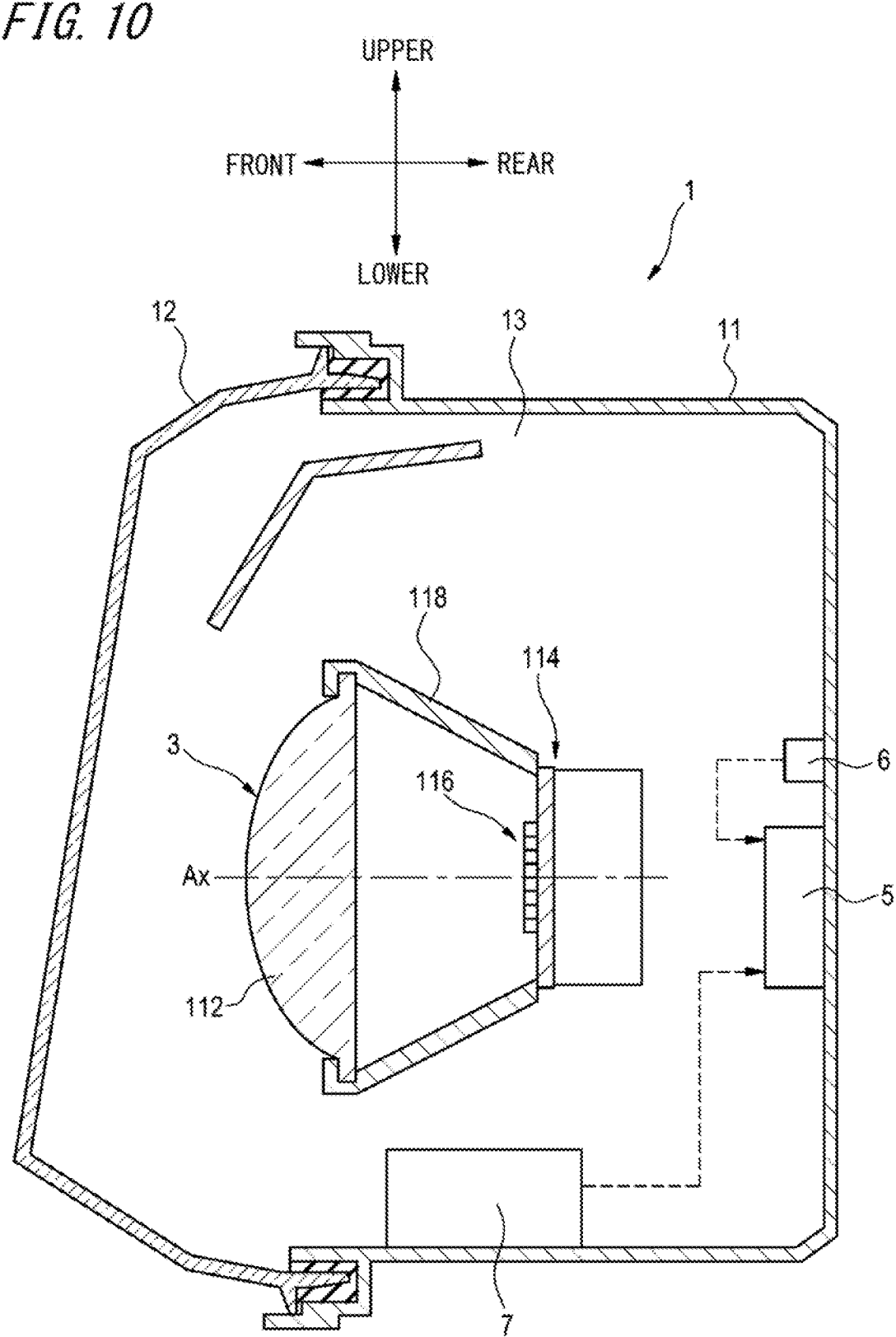
FIG. 10 is a sectional view depicting a configuration of a high beam lamp unit provided to the headlamp in accordance with the first embodiment.

FIG. 3 is a vertical sectional view depicting a schematic configuration of the low beam lamp unit 2 provided to the headlamp 1 in accordance with a first embodiment. As shown in FIG. 3, the headlamp 1 includes a lamp body 11 having an opening on a front side of the vehicle, and a transparent front cover 12 attached to cover the opening of the lamp body 11. In a lamp chamber 13 formed by the lamp body 11 and the front cover 12, the low beam lamp unit 2, the lamp control unit 5, the bank angle sensor 6, the external sensor (for example LiDAR) 7 and the like are accommodated. In the meantime, although not shown in the sectional view of FIG. 3, as with the low beam lamp unit 2, the high beam lamp unit 3 is also accommodated in the lamp chamber 13 of the headlamp 1, as shown in FIG. 10.

The low beam lamp unit 2 includes a light source unit 20, and a light distribution unit 30 (an example of an optical member) configured to reflect light from the light source unit 20. The light source unit 20 and the light distribution unit 30 are supported in predetermined positions in the lamp chamber 13 by a support plate 41. The support plate 41 is attached to the lamp body 11 via an aiming screw 42.

The light source unit 20 includes a plurality of (three, in the first example) light sources 21, a heat sink 22, a plurality of (four, in the first example) lenses 23, and a light condensing part 24. The light source unit 20 is fixed to a front surface of the support plate 41. Each of the light sources 21 is electrically connected to the lamp control unit 5.

The light distribution unit 30 has a terminal part 37, and a reflecting mirror 38. The light distribution unit 30 is positionally determined with respect to the light source unit 20 so that the laser light emitted from the light source unit 20 can be reflected ahead of the low beam lamp unit 2 via the reflecting mirror 38. The light distribution unit 30 is fixed to a tip end of a protrusion 43 protruding forward from a front surface of the support plate 41. The terminal part 37 is electrically connected to the lamp control unit 5.

The lamp control unit 5 is fixed to the lamp body 11 at the rear of the support plate 41. In the meantime, the position in which the lamp control unit 5 is provided is not limited thereto. The low beam lamp unit 2 is configured to adjust an optical axis in the horizontal direction and in the vertical direction by rotating the aiming screw 42 to adjust a posture of the support plate 41.

Figure 4:
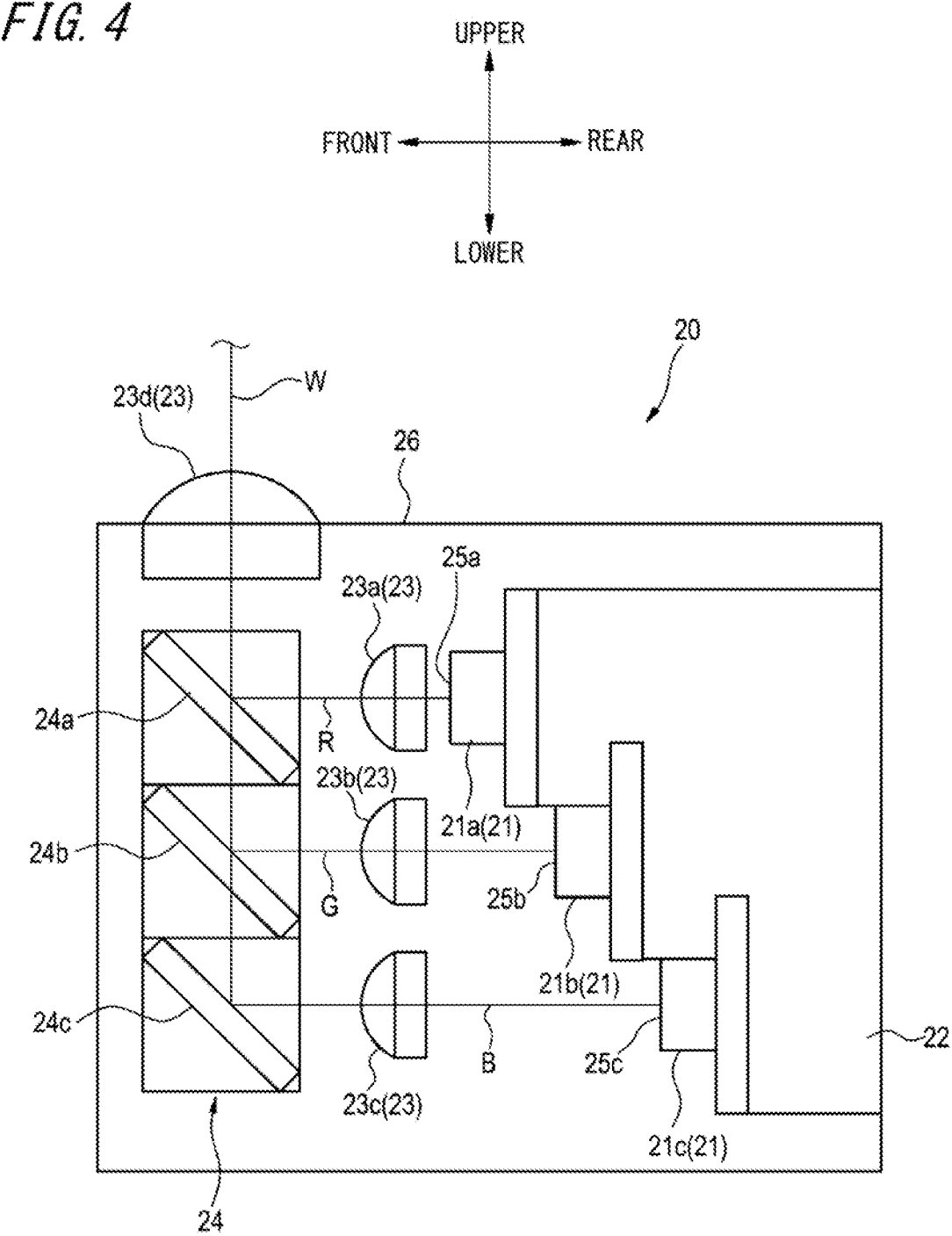
FIG. 4 depicts a configuration of a light source unit of the low beam lamp unit.

FIG. 4 is a side view of the light source unit 20 configuring the low beam lamp unit 2. As shown in FIG. 4, the light source unit 20 includes a first light source 21a, a second light source 21b, a third light source 21c, the heat sink 22, a first lens 23a, a second lens 23b, a third lens 23c, a fourth lens 23d, and the light condensing part 24.

The first light source 21a is a light source configured to emit red laser light R, and is configured by a light-emitting element consisting of a red laser diode. Likewise, the second light source 21b is configured by a green laser diode configured to emit green laser light G, and the third light source 21c is configured by a blue laser diode configured to emit blue laser light B. The first light source 21a, the second light source 21b, and the third light source 21c are disposed so that a laser light emission surface 25a, a laser light emission surface 25b, and a laser light emission surface 25c, which are light emission surfaces thereof, are parallel to each other. In the meantime, the light-emitting element of each light source is not limited to the laser diode.

The first light source 21a to the third light source 21c are disposed so that the laser light emission surfaces 25a to 25c are to face ahead of the low beam lamp unit 2, and are attached to the heat sink 22. The heat sink 22 is formed of a material having high heat conductivity such as aluminum, and is attached to the light source unit 20 in a state in which a rear surface of the heat sink 22 is in contact with the support plate 41 (refer to FIG. 3).

The first lens 23a to the fourth lens 23d are respectively configured by a collimate lens, for example. The first lens 23a is provided on a light path of the red laser light R between the first light source 21a and the light condensing part 24, and is configured to convert the red laser light R emitted from the first light source 21a into parallel light and to emit the same to the light condensing part 24. The second lens 23b is provided on a light path of the green laser light G between the second light source 21b and the light condensing part 24, and is configured to convert the green laser light G emitted from the second light source 21b into parallel light and to emit the same to the light condensing part 24.

The third lens 23c is provided on a light path of the blue laser light B between the third light source 21c and the light condensing part 24, and is configured to convert the blue laser light B emitted from the third light source 21c into parallel light and to emit the same to the light condensing part 24. The fourth lens 23d is fitted in an opening provided at an upper part of a housing 26 of the light source unit 20. The fourth lens 23d is provided on a light path of white laser light W (which will be described later) between the light condensing part 24 and the light distribution unit 30 (refer to FIG. 3), and is configured to convert the white laser light W emitted from the light condensing part 24 into parallel light and to emit the same to the light distribution unit 30.

The light condensing part 24 is configured to condense the red laser light R, the green laser light G and the blue laser light B, thereby generating the white laser light W. The light condensing part 24 includes a first dichroic mirror 24a, a second dichroic mirror 24b, and a third dichroic mirror 24c.

The first dichroic mirror 24a is a mirror for reflecting at least the red light and causing the blue light and the green light to transmit therethrough, and is disposed to reflect the red laser light R having transmitted the first lens 23a toward the fourth lens 23d. The second dichroic mirror 24b is a mirror for reflecting at least the green light and causing the blue light to transmit therethrough, and is disposed to reflect the green laser light G having transmitted the second lens 23b toward the fourth lens 23d. The third dichroic mirror 24c is a mirror for reflecting at least the blue light, and is disposed to reflect the blue laser light B having transmitted the third lens 23c toward the fourth lens 23d.

Also, the first dichroic mirror 24a to the third dichroic mirror 24c are positionally determined with respect to each other so that the light paths of the laser lights reflected by the mirrors are to be parallel and the respective laser lights are to be condensed and to be incident on the fourth lens 23d. In the first embodiment, the first dichroic mirror 24a to the third dichroic mirror 24c are disposed so that regions (reflecting points of the laser lights), with which the laser lights are to collide, of the respective dichroic mirrors 24a to 24c are aligned side by side on a line.

The blue laser light B emitted from the third light source 21c is reflected by the third dichroic mirror 24c, and then travels toward the second dichroic mirror 24b. The green laser light G emitted from the second light source 21b is reflected toward the first dichroic mirror 24a by the second dichroic mirror 24b, and is superimposed on the blue laser light B having transmitted the second dichroic mirror 24b. The red laser light R emitted from the first light source 21a is reflected toward the fourth lens 23d by the first dichroic mirror 24a, and is superimposed on the aggregate light of the blue laser light B and green laser light G having transmitted the first dichroic mirror 24a. As a result, the white laser light W is formed, and the formed white laser light W travels toward the light distribution unit 30 through the fourth lens 23d.

Of the first light source 21a to the third light source 21c, the first light source 21a configured to emit the red laser light R is disposed in a position closest from the light condensing part 24, the third light source 21c configured to emit the blue laser light B is disposed in a position most distant from the light condensing part 24, and the second light source 21b configured to emit the green laser light G is disposed in an intermediate position. That is, the first light source 21a to the third light source 21c are disposed closer to the light condensing part 24 as the wavelength of the laser light emitted therefrom is longer.

Figure 5:
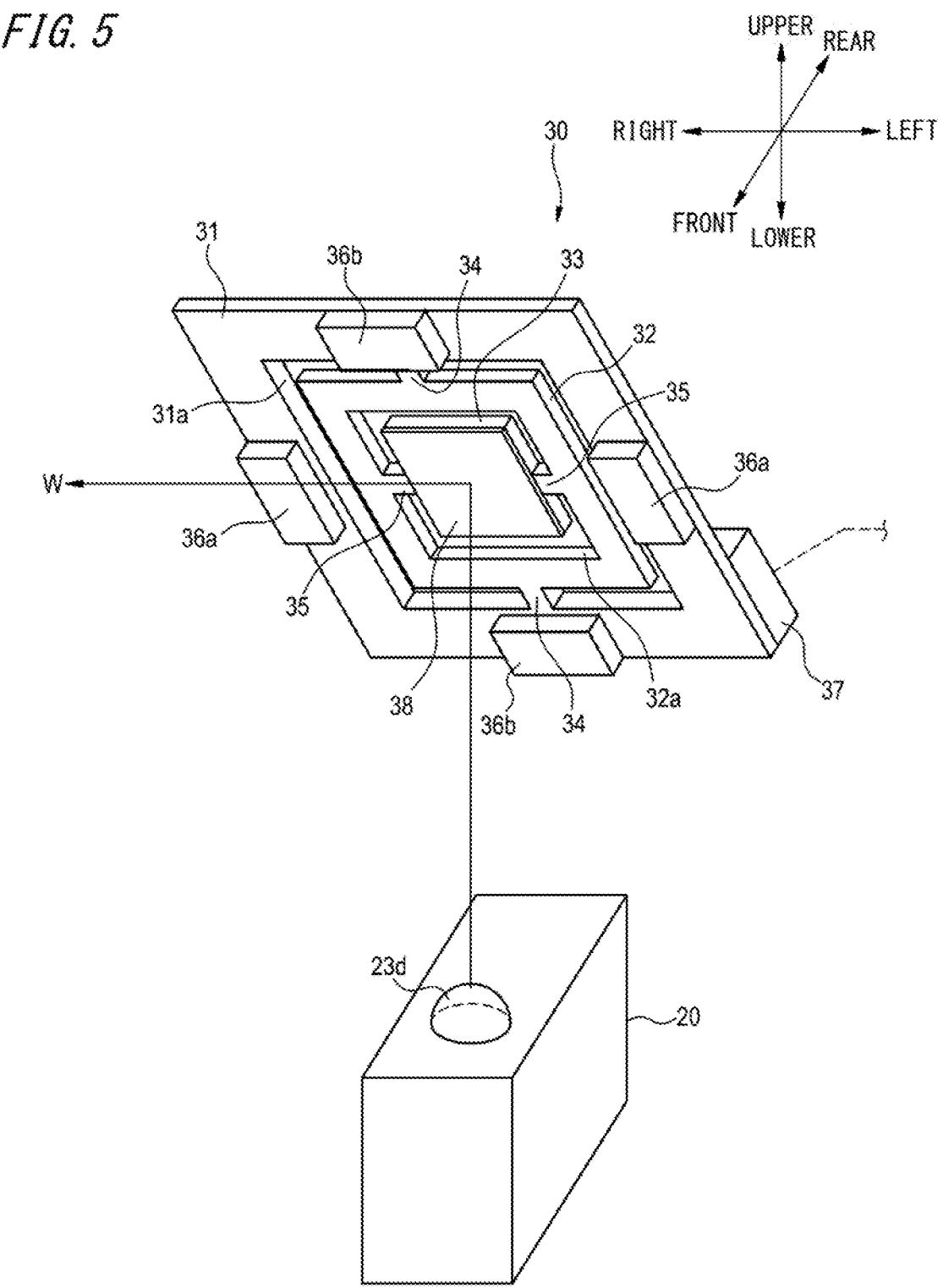
FIG. 5 depicts a configuration of a light distribution unit of the low beam lamp unit.

FIG. 5 is a perspective view depicting the light distribution unit 30 configuring the low beam lamp unit 2, as observed from the front. As shown in FIG. 5, the light distribution unit 30 includes a base 31, a first rotating body 32, a second rotating body 33, a first torsion bar 34, a second torsion bar 35, permanent magnets 36a and 36b, the terminal part 37, and the reflecting mirror 38. The light distribution unit 30 is configured by a Galvano mirror, for example. In the meantime, the light distribution unit 30 may be configured by a MEMS mirror or a polygon mirror, for example.

The base 31 is a frame body having an opening 31a formed at a center thereof, and is fixed to the protrusion 43 (refer to FIG. 3) with being inclined in the front and rear direction of the low beam lamp unit 2. The first rotating body 32 is disposed in the opening 31a of the base 31. The first rotating body 32 is a frame body having an opening 32a formed at a center thereof. The first rotating body 32 is supported to the base 31 so as to be rotatable in the right and left direction (vehicle width direction) by the first torsion bar 34 extending in a front and upper direction from a rear and lower side of the low beam lamp unit 2.

The second rotating body 33 is disposed in the opening 32a of the first rotating body 32. The second rotating body 33 is a rectangular flat plate. The second rotating body 33 is supported to the first rotating body 32 so as to be rotatable in the upper and lower direction (vertical direction) by the second torsion bar 35 extending in the vehicle width direction of the automatic two-wheeled vehicle 100. When the first rotating body 32 is rotated in the right and left direction about the first torsion bar 34, which is a rotational shaft, the second rotating body 33 is rotated in the right and left direction together with the first rotating body 32. A surface of the second rotating body 33 is provided with the reflecting mirror 38 by plating, vapor deposition or the like.

The base 31 is provided with a pair of permanent magnets 36a in positions perpendicular to the extension direction of the first torsion bar 34. The permanent magnets 36a form a magnetic field perpendicular to the first torsion bar 34. The first rotating body 32 is wired thereon with a first coil (not shown). The first coil is connected to the lamp control unit 5 via the terminal part 37. Also, the base 31 is provided with a pair of permanent magnets 36b in positions perpendicular to the extension direction of the second torsion bar 35. The permanent magnets 36b form a magnetic field perpendicular to the second torsion bar 35. The second rotating body 33 is wired thereon with a second coil (not shown). The second coil is connected to the lamp control unit 5 via the terminal part 37.

Magnitudes and directions of currents flowing through the first coil and the second coil are controlled, so that the first rotating body 32 and the second rotating body 33 are reciprocally rotated in the right and left direction and the second rotating body 33 is independently reciprocally rotated in the upper and lower direction. Thereby, the reflecting mirror 38 is reciprocally rotated in the upper and lower direction and the right and left direction.

The light source unit 20 and the light distribution unit 30 are positionally determined with respect to each other so that the white laser light W emitted from the light source unit 20 is to be reflected ahead of the low beam lamp unit 2 by the reflecting mirror 38. The light distribution unit 30 is configured to scan a region ahead of the automatic two-wheeled vehicle 100 with the white laser light W by the reciprocal rotation of the reflecting mirror 38. For example, the light distribution unit 30 scans a formation region of a low beam light distribution pattern by the white laser light W. Thereby, the white laser light W is light-distributed in the formation region of the low beam light distribution pattern, so that a predetermined low beam light distribution pattern is formed ahead of the automatic two-wheeled vehicle 100.

Figure 6:
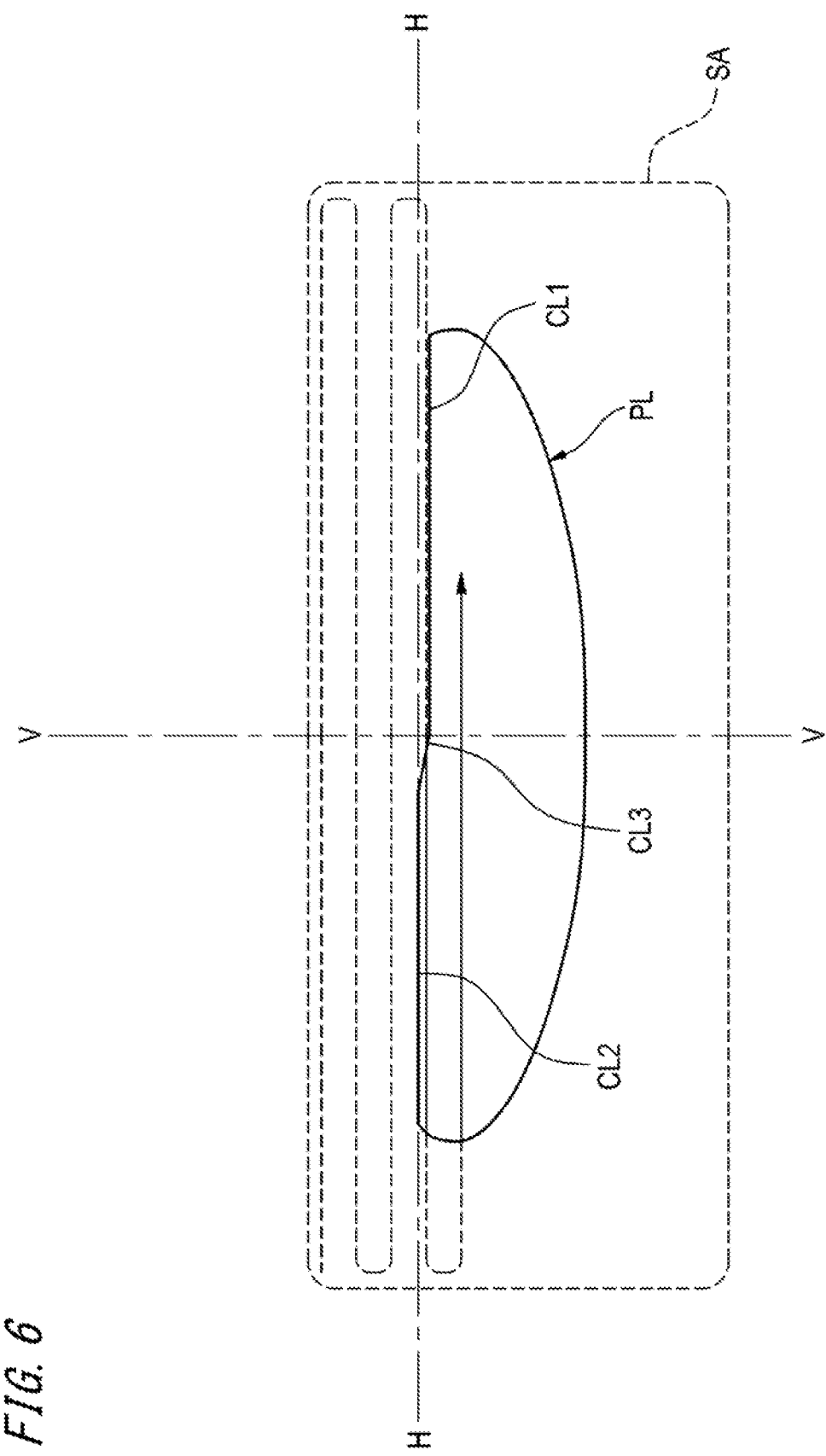
FIG. 6 depicts an example of a low beam light distribution pattern to be formed by the low beam lamp unit.

FIG. 6 depicts an example of the low beam light distribution pattern to be formed by the low beam lamp unit 2 in accordance with the first embodiment. Meanwhile, FIG. 6 depicts a low beam light distribution pattern formed on a virtual vertical screen disposed in a predetermined position ahead of the lamp, for example, in a position 25 m ahead of the lamp. In the meantime, a line H-H indicates the horizontal direction, and a line V-V indicates the vertical direction.

The light distribution unit 30 of the low beam lamp unit 2 in accordance with the first embodiment can scan a rectangular scanning region SA extending in the vehicle width direction by the white laser light W. The lamp control unit 5 controls each of the light sources 21 to emit the laser light from each of the light sources 21 when a scanning position of the light distribution unit 30 is within a low beam light distribution pattern PL. On the other hand, when the scanning position of the light distribution unit 30 is outside the low beam light distribution pattern PL, the lamp control unit 5 controls each of the light sources 21 to stop the emission of the laser light from each of the light sources 21. Thereby, the low beam light distribution pattern PL having an opposite traffic line-side cutoff line CL1, a host traffic line-side cutoff line CL2 and an oblique cutoff line CL3 is formed.

Figure 7:
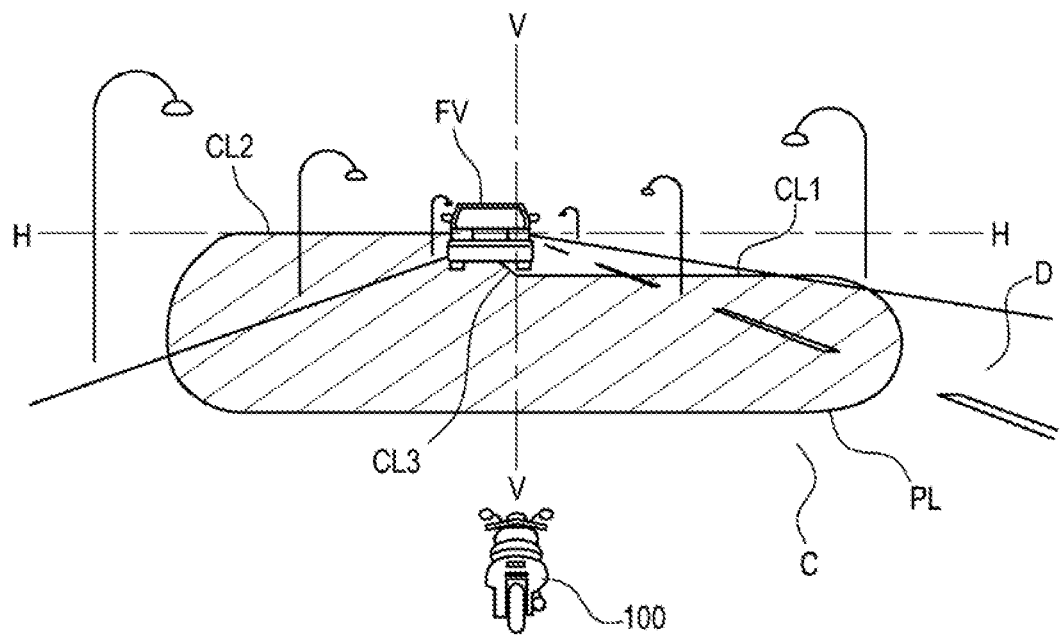
FIG. 7 illustrates a low beam light distribution pattern.

Subsequently, a method of controlling the low beam light distribution pattern that is to be formed ahead of the lamp by irradiation of the light from the low beam lamp unit 2 is described with reference to FIGS. 7 to 9. FIG. 7 depicts a situation in which the automatic two-wheeled vehicle 100 travels on a host traffic lane C of a road having the host traffic lane C and an opposite traffic lane D. In the meantime, FV indicates a preceding traveling vehicle.

FIG. 7 depicts a low beam light distribution pattern PL that is formed ahead of the lamp by the low beam lamp unit 2 in a state in which the vehicle body of the automatic two-wheeled vehicle 100 is not tilted. FIG. 8 depicts a low beam light distribution pattern PL1 that is formed ahead of the lamp by a low beam lamp unit (a low beam lamp unit of the related art) having no function of adjusting the low beam light distribution pattern in a state in which the vehicle body of the automatic two-wheeled vehicle 100 is tilted leftward. FIG. 9 depicts a low beam light distribution pattern PL2 that is formed ahead of the lamp by the low beam lamp unit 2 of the first embodiment in the state in which the vehicle body of the automatic two-wheeled vehicle 100 is tilted leftward.

As shown in FIG. 7, when the automatic two-wheeled vehicle 100 travels in a state in which the vehicle body is upright with respect to a road surface, for example, travels straight on a straight road, the white laser light W irradiated from the low beam lamp unit 2 is irradiated ahead of the lamp as the low beam light distribution pattern PL having such a shape that the opposite traffic line-side cutoff line CL and the host traffic line-side cutoff line CL2 are formed along the horizontal direction H.

Figure 8:
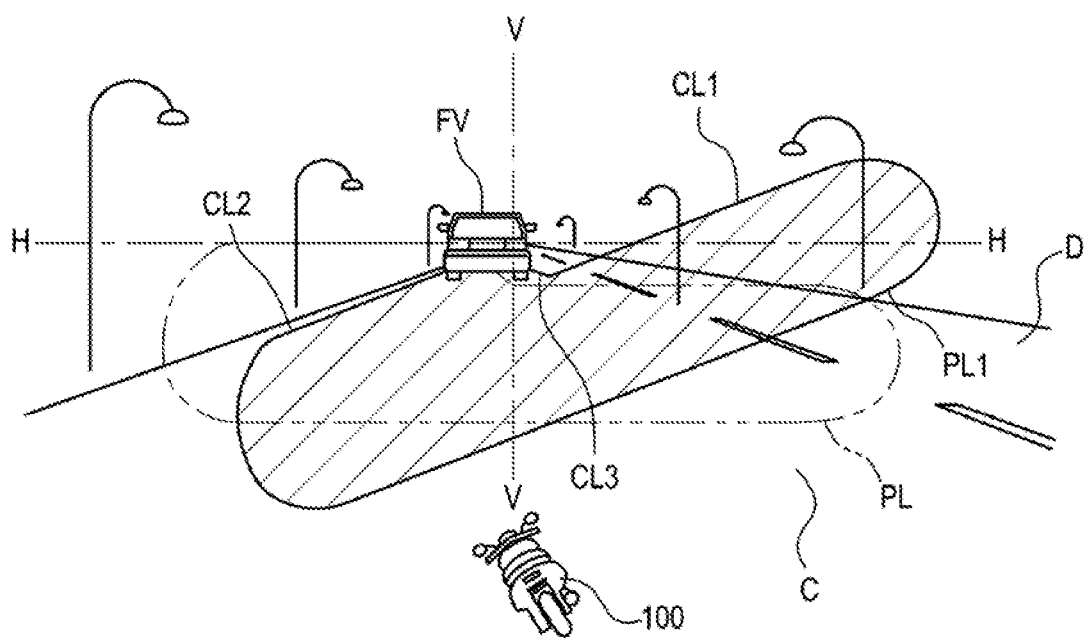
FIG. 8 illustrates a low beam light distribution pattern.

In the meantime, as shown in FIG. 8, when the automatic two-wheeled vehicle 100 tilts the vehicle body leftward with respect to the road surface, for example, travels with tilting the vehicle body leftward with respect to the road surface so as to move to the left of the road, in the low beam lamp unit of the related art, the irradiated white laser light W is irradiated ahead of the lamp as a low beam light distribution pattern PL1 having such a shape that the opposite traffic line-side cutoff line CL1 and the host traffic line-side cutoff line CL2 are tilted with respect to the horizontal direction H (tilted according to the tilted state of the automatic two-wheeled vehicle 100).

Figure 9:
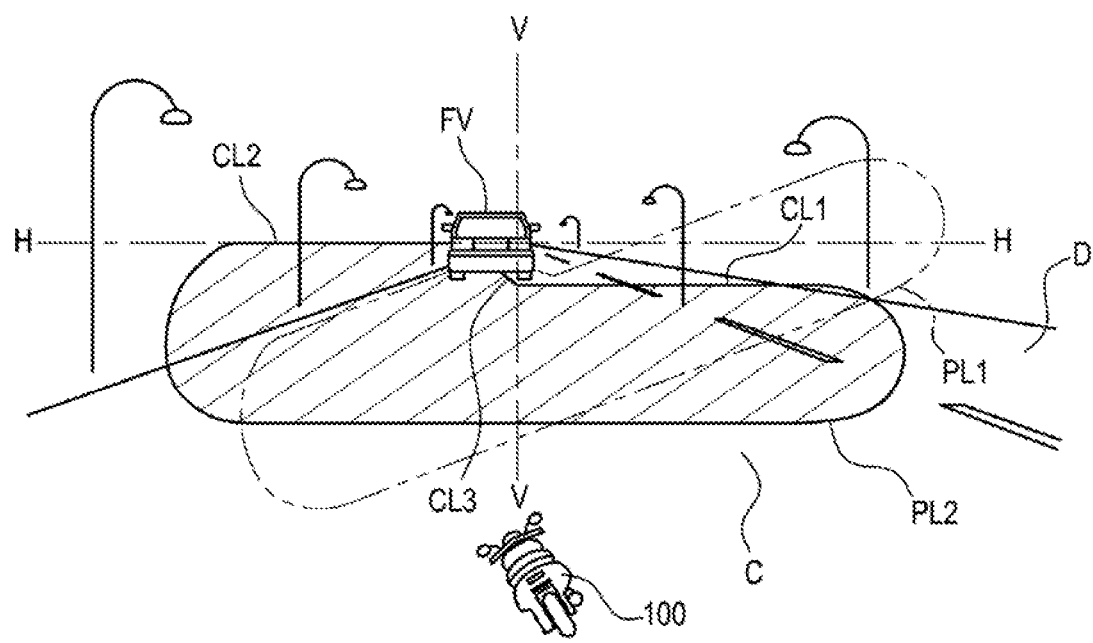
FIG. 9 illustrates a low beam light distribution pattern.

In contrast, as shown in FIG. 9, according to the low beam lamp unit 2 of the first embodiment, even when the automatic two-wheeled vehicle 100 travels with tilting the vehicle body leftward, for example, like the above case, the irradiated white laser light W is irradiated ahead of the lamp as a low beam light distribution pattern PL2 having such a shape that the opposite traffic line-side cutoff line CL1 and the host traffic line-side cutoff line CL2 are formed along the horizontal direction H. The reason is that the shape of the low beam light distribution pattern PL2, which is formed by controlling the scanning direction of the Galvano mirror, which is the light distribution unit 30, and the emission timing of the laser light from each of the light sources 21, is adjusted to maintain the opposite traffic line-side cutoff line CL1 and the host traffic line-side cutoff line CL2 along the horizontal direction H according to the tilted state of the automatic two-wheeled vehicle 100 by the lamp control unit 5.

The lamp control unit 5 acquires the tilt angle information of the vehicle body of the automatic two-wheeled vehicle 100, which is detected by the bank angle sensor 6, from the bank angle sensor 6. The lamp control unit 5 calculates tilt angles of the cutoff lines CL1 and CL2 of the low beam light distribution pattern PL1 when formed without correction, based on the tilt angle information of the vehicle body, and also calculates a tilt correction amount necessary to correct the tilt angles. The lamp control unit 5 determines, based on the calculated tilt correction amount, a corrected low beam light distribution pattern of which a shape has been already corrected, so as to set the low beam light distribution pattern, which is to be formed ahead of the lamp, as a low beam light distribution pattern PL2 of which the cutoff lines CL1 and CL2 are maintained along the horizontal direction H.

The lamp control unit 5 generates a control signal for forming the corrected low beam light distribution pattern, and transmits the same to the light distribution unit 30 and each of the light sources 21 (21a to 21c). The light distribution unit 30 and each of the light sources 21 (21a to 21c) form the corrected low beam light distribution pattern, based on the control signal. Thereby, as shown in FIG. 9, a low beam light distribution pattern (the corrected low beam light distribution pattern) PL2 in which the opposite traffic line-side cutoff line CL1 and the host traffic line-side cutoff line CL2 are maintained along the horizontal direction H is formed ahead of the lamp. That is, in the low beam light distribution pattern PL2 corresponding to when the vehicle body is tilted, the lamp control unit 5 adjusts so that no light from each of the light sources 21 is not irradiated to a region located outside the low beam light distribution pattern PL corresponding to when the vehicle body is in the vertical state. In this way, even when the automatic two-wheeled vehicle 100 travels with the vehicle body being tilted, it is possible to maintain the low beam light distribution pattern having a shape corresponding to the shape of the low beam light distribution pattern PL (refer to FIG. 7) that is formed ahead of the lamp when the vehicle body is not tilted (in the vertical state).

The headlamp 1 having the low beam lamp unit 2 configured as described above includes the light source 21, the light distribution unit 30 configured to form the predetermined low beam light distribution pattern PL by irradiating the light from the light source 21 toward the region ahead of the lamp, and the lamp control unit 5 configured to adjust the low beam light distribution pattern PL according to the tilted state of the vehicle body of the automatic two-wheeled vehicle 100. The lamp control unit 5 is configured to adjust the low beam light distribution pattern PL2 so that in the low beam light distribution pattern PL2 corresponding to when the vehicle body is tilted, no light from the light source 21 is irradiated to the region located outside the low beam light distribution pattern PL corresponding to when the vehicle body is in the vertical state. Specifically, even when the vehicle body of the automatic two-wheeled vehicle 100 is tilted, the lamp control unit 5 adjusts the low beam light distribution pattern PL2 so that the cutoff lines CL1 and CL2 are maintained along the horizontal direction H. Thereby, upon the bank of the vehicle body, it is possible to maintain the low beam light distribution pattern PL2 at an appropriate angle, which can contribute to improvements on safety in assisting the driving, for example.

In the first embodiment, the lamp control unit 5 is configured to adjust the low beam light distribution pattern PL by controlling the light scanning direction by the light distribution unit 30 consisting of the Galvano mirror, for example. Thereby, it is possible to easily adjust the low beam light distribution pattern PL.

Also, in the first embodiment, since the headlamp 1 includes the bank angle sensor 6, it is possible to correctly detect the tilted state of the vehicle body. For this reason, it is possible to appropriately reflect the detected tilt information in the formation of the low beam light distribution pattern PL.

Also, in the first embodiment, since the headlamp 1 includes the external sensor 7, it is possible to appropriately reflect the environment information around the vehicle in the formation of the low beam light distribution pattern PL.

Subsequently, a configuration of the high beam lamp unit 3 provided to the headlamp 1 is described with reference to FIGS. 10 and 11.

The high beam lamp unit 3 is a so-called projector-type lamp, and includes a projector lens 112, a light source unit 114 having a light source 116 for high beam irradiation, and a holder 118 configured to hold the projector lens 112 and the light source unit 114. The projector lens 112 is a plano-convex aspherical lens of which a front surface is a convex surface and a rear surface is a planar surface, and is disposed on an optical axis Ax extending in the front and rear direction of the vehicle. The projector lens 112 is held at a peripheral edge portion by a front end side of the holder 118.

The light source unit 114 is held on a rear end side of the holder 118 with the light source 116 being disposed toward the front in the direction of the optical axis Ax. As described later, the light source unit 114 of the first embodiment is configured as an LED array, for example. The holder 118 is attached to the lamp body 11 via a support member (not shown). In the meantime, the structure of the high beam lamp unit 3 is not particularly limited to the above, and may be a reflection-type lamp, as with the low beam lamp unit 2.

Figure 11:
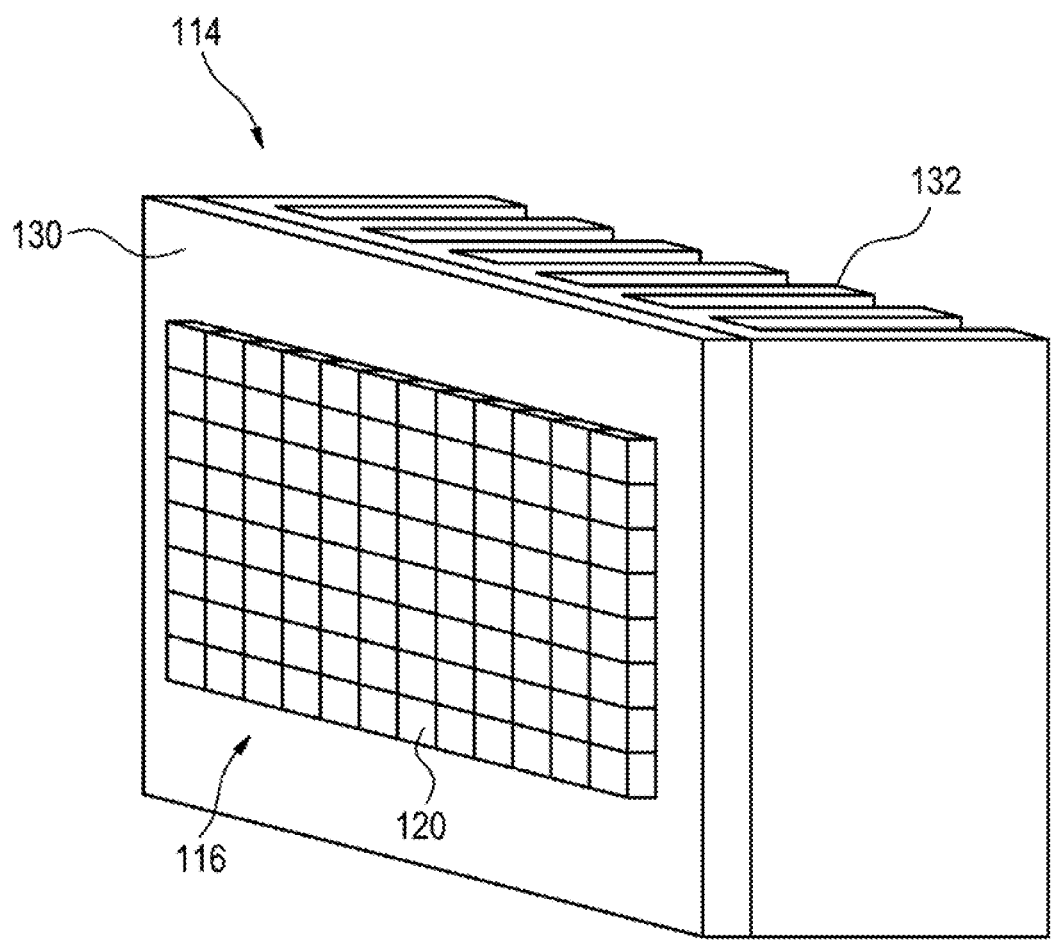
FIG. 11 is a perspective view depicting a configuration of a light source unit of the high beam lamp unit shown in FIG. 10.

FIG. 11 is a perspective view depicting a schematic structure of the light source unit 114. The light source unit 114 includes a light source 116, a support plate 130, and a heat sink 132. The light source 116 has a plurality of individual light sources 120 each of which consists of a light-emitting element such as a light-emitting diode (LED), for example. The individual light sources 120 are disposed adjacent to each other in 12 columns and 8 rows, for example, and are fixed on a front surface of the support plate 130. The light irradiations of the plurality of individual light sources 120 are independently controlled in an ADB mode by the lamp control unit 5, which will be described later. In the meantime, the numbers and arrangement of the individual light sources are not particularly limited. Also, one individual light source may be formed by the plurality of light-emitting elements.

The heat sink 132 is a member for radiating heat from the light source 116, and is held on a surface of the support plate 130 facing toward the rear of the vehicle. The light source unit 114 is fixed to the holder 118 via the support plate 130.

Figure 12:
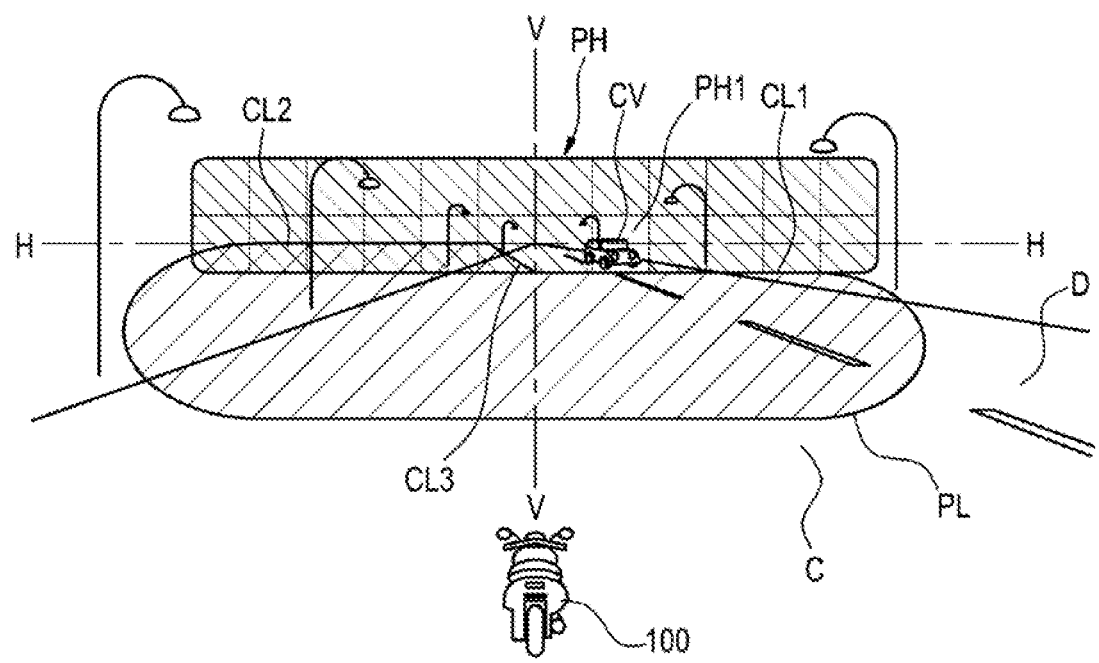
FIG. 12 illustrates a high beam light distribution pattern to be formed by the high beam lamp unit shown in FIG. 10.

FIG. 12 pictorially depicts a low beam light distribution pattern and a high beam light distribution pattern to be formed by the vehicle lamp. FIG. 12 depicts the light distribution patterns formed on a virtual vertical screen arranged in a predetermined position ahead of the lamp, for example, in a position 25 m ahead of the lamp.

In the headlamp 1 of the first embodiment, a high beam light distribution pattern PH is formed by irradiation light of the high beam lamp unit 3. The high beam light distribution pattern PH is a light distribution pattern formed in addition to the low beam light distribution pattern PL. The high beam light distribution pattern PH is added to the low beam light distribution pattern PL so that an irradiation region is to be formed at least above the opposite traffic line-side cutoff line CL1 of the low beam light distribution pattern PL. The high beam light distribution pattern PH is a light distribution pattern formed as a result of synthesis of partial patterns formed by each of the plurality of individual light sources 120. Also, the high beam lamp unit 3 can form a plurality of additional light distribution patterns having different shapes by combinations of formation and non-formation of the respective partial patterns in an ADB mode (which will be described later), in correspondence to a situation of the host vehicle or the preceding vehicle.

Subsequently, an ADB (Adaptive Driving Beam) mode that is executed by the lamp control unit 5 in accordance with the first embodiment is described in detail. The lamp control unit 5 can detect situations of the preceding vehicle, including presence or absence and a presence position of the preceding vehicle, based on the environment information acquired by the external sensor 7 mounted on the automatic two-wheeled vehicle 100, for example. The external sensor 7 is configured to transmit a detection result of the environment information to the lamp control unit 5. Also, the lamp control unit 5 can detect situations of the host vehicle, including traveling and stop of the host vehicle, based on the information acquired by the speed sensor 8 mounted on the automatic two-wheeled vehicle 100, for example.

When the lamp control unit 5 acquires the information from the external sensor 7 and/or the speed sensor 8, the lamp control unit controls individually the lighting/lights-out of the individual light sources 120, based on the information input from the outside. Specifically, the lamp control unit 5 is configured to control the lighting/lights-out of each of the individual light sources 120 so that the individual light sources 120, which are in a region to be used for formation of the high beam light distribution pattern PH, of the plurality of the individual light sources 120 are to be turned on and the individual light sources 120, which are in a region not to be used for formation of the high beam light distribution pattern PH, are to be turned off. Also, the lamp control unit 5 is configured to turn off the individual light source 21 corresponding to a region in which there is a target object such as a preceding vehicle.

Figure 13:
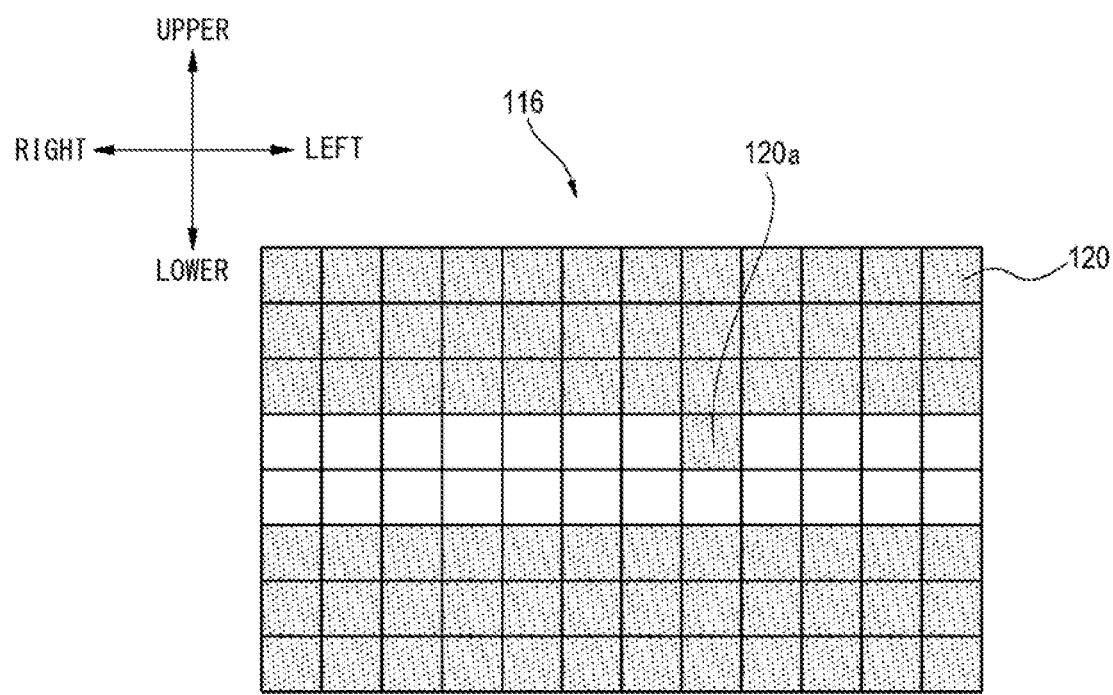
FIG. 13 is a pictorial view depicting lighting regions and lights-out regions of individual light sources of the light source unit.

For example, as shown in FIG. 13, the lamp control unit 5 turns off the individual light sources 120 in the upper and lower three rows of the plurality of the individual light sources 120, and turns on the individual light sources 120 in the central two lines. Also, the lamp control unit 5 determines a region in which there is a target object such as a preceding vehicle, as a non-irradiation region (light shielding region), and turns off the individual light source 120 corresponding to the non-irradiation region, for example, the individual light source 120a (the individual light source at the fifth light source from the right in the upper row of the individual light sources 120 in the central two rows) corresponding to a region in which there is an oncoming vehicle CV of FIG. 12. Thereby, as shown in FIG. 12, it is possible to form the high beam light distribution pattern PH in the ADB mode in which the region, in which there is the oncoming vehicle CV, is set as a non-irradiation region PH1. In the meantime, the "non-irradiation region" may include a region in which light is to be irradiated with a low illuminance at which the glare is not to be provided to a driver of the preceding vehicle.

Figure 14:
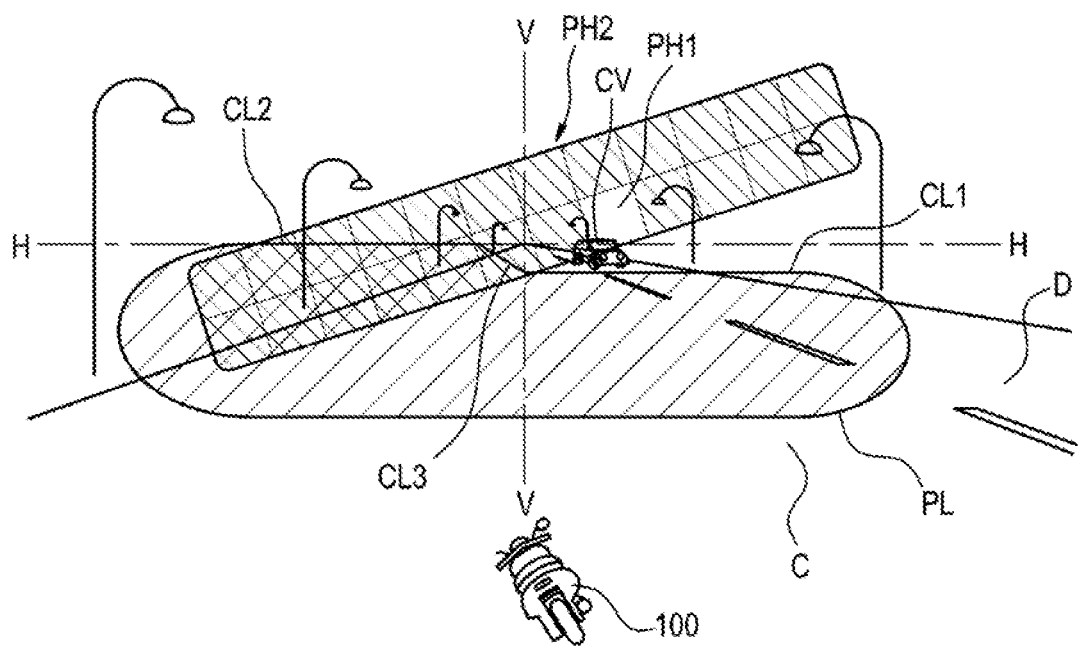
FIG. 14 illustrates a high beam light distribution pattern.

In the meantime, as shown in FIG. 14, in a case in which the automatic two-wheeled vehicle 100 tilts the vehicle body leftward with respect to the road surface, for example, travels with tilting the vehicle body leftward so as to move to the left of the road, if the positions of the individual light sources 120 in the lighting state and the individual light sources 120 in the lights-out state of the plurality of individual light sources 120 are fixed, the light irradiated from the high beam lamp unit 3 is formed ahead of the lamp, as the high beam light distribution pattern PH2 tilted with respect to the horizontal direction H according to the tilted state of the automatic two-wheeled vehicle 100. For this reason, an amount of light becomes insufficient and far visibility is lowered in a region in front of the automatic two-wheeled vehicle 100, particularly, on a side in the turning direction, in some cases. Also, at least a part of the region in which there is the oncoming vehicle CV deviates from the non-irradiation region PH1 (i.e., is included in the irradiation region), so that the glare may be provided to the driver of the oncoming vehicle CV.

Figure 15:
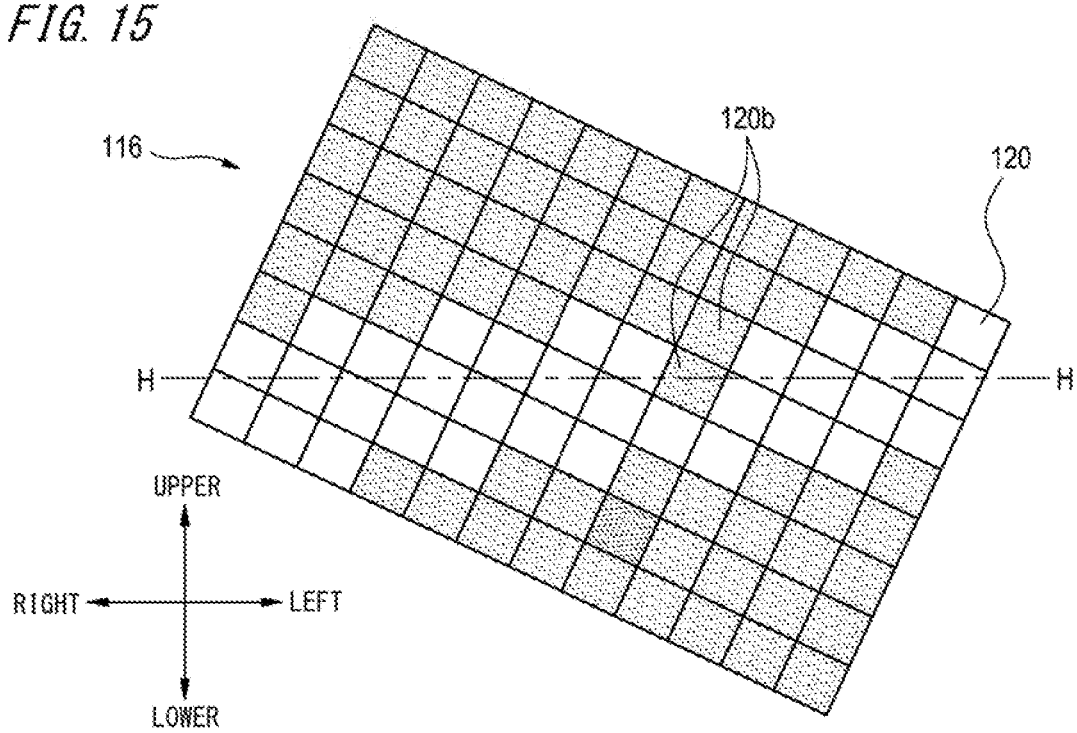
FIG. 15 is a pictorial view depicting lighting regions and lights-out regions of the individual light sources of which lighting is controlled in correspondence to a bank state of the vehicle.

In contrast, according to the headlamp 1 of the first embodiment, even when the automatic two-wheeled vehicle 100 travels with tilting the vehicle body, as described above, the lamp control unit 5 controls the lighting/lights-out of the respective individual light sources 120 of the high beam lamp unit 3 so that a light distribution pattern having such a shape that a longitudinal direction of the high beam light distribution pattern PH is substantially along the horizontal direction H is to be formed ahead of the lamp. Specifically, as shown in FIG. 15, even when the automatic two-wheeled vehicle 100 is tilted, the lamp control unit 5 controls the lighting/lights-out of the individual light sources 120 so that the longitudinal direction of the high beam light distribution pattern PH is substantially along the horizontal direction H. That is, the positions of the individual light sources 120, which are to be turned on so as to form the high beam light distribution pattern PH, of the plurality of individual light sources 120 aligned as an LED array can be appropriately changed according to the tilted state of the automatic two-wheeled vehicle 100.

Also, the lamp control unit 5 is configured to control the lighting/lights-out of the respective individual light sources 120 so that the non-irradiation region PH1 continues to be arranged in a part corresponding to the oncoming vehicle CV. Specifically, as shown in FIG. 15, the lamp control unit 5 turns off the individual light sources 120b, which correspond to a position in which there is the oncoming vehicle CV, of the individual light sources 120. That is, the positions of the individual light sources 120b, which are to be turned off in correspondence to the position of the oncoming vehicle CV, can be appropriately changed according to the tilted state and speed of the automatic two-wheeled vehicle 100 and the current position of the oncoming vehicle CV.

The headlamp 1 having the high beam lamp unit 3 configured as described above includes the light source 116, the projector lens 112 configured to form a predetermined high beam light distribution pattern PH by irradiating the light emitted from the light source 116 toward a region ahead of the lamp, and the lamp control unit 5 configured to adjust the high beam light distribution pattern PH according to the tilted state of the vehicle body of the automatic two-wheeled vehicle 100. The lamp control unit 5 is configured to adjust the high beam light distribution pattern PH so that in the high beam light distribution pattern PH1 corresponding to when the vehicle body is tilted, no light is irradiated in a region located outside the high beam light distribution pattern PH corresponding to when the vehicle body is in the vertical state. Specifically, the lamp control unit 5 is configured to adjust the lighting/lights-out of the individual light sources 120 so that even when the automatic two-wheeled vehicle 100 is tilted, the longitudinal direction of the high beam light distribution pattern PH is substantially along the horizontal direction H. Thereby, even when the automatic two-wheeled vehicle 100 travels with being tilted leftward or rightward, the appropriate high beam light distribution pattern PH can be formed, which can contribute to improvement on safety in assisting the driving, for example.

Also, even when the vehicle body of the automatic two-wheeled vehicle 100 is tilted, the lamp control unit 5 adjusts the high beam light distribution pattern PH so that the non-irradiation region PH1 continues to be arranged in a part corresponding to the position in which there is the oncoming vehicle CV. Thereby, upon the bank of the vehicle, it is possible to appropriately maintain the non-irradiation region PH1 of the high beam light distribution pattern PH. For this reason, it is possible to securely prevent the glare to the driver of the oncoming vehicle CV or the preceding traveling vehicle.

Also, in the first embodiment, the light source 116 includes the plurality of individual light sources 120 aligned in parallel, and the lamp control unit 5 is configured to adjust the high beam light distribution pattern PH by controlling the lighting/lights-out of the plurality of individual light sources 120. Thereby, it is possible to easily adjust the high beam light distribution pattern PH.

Figure 16:
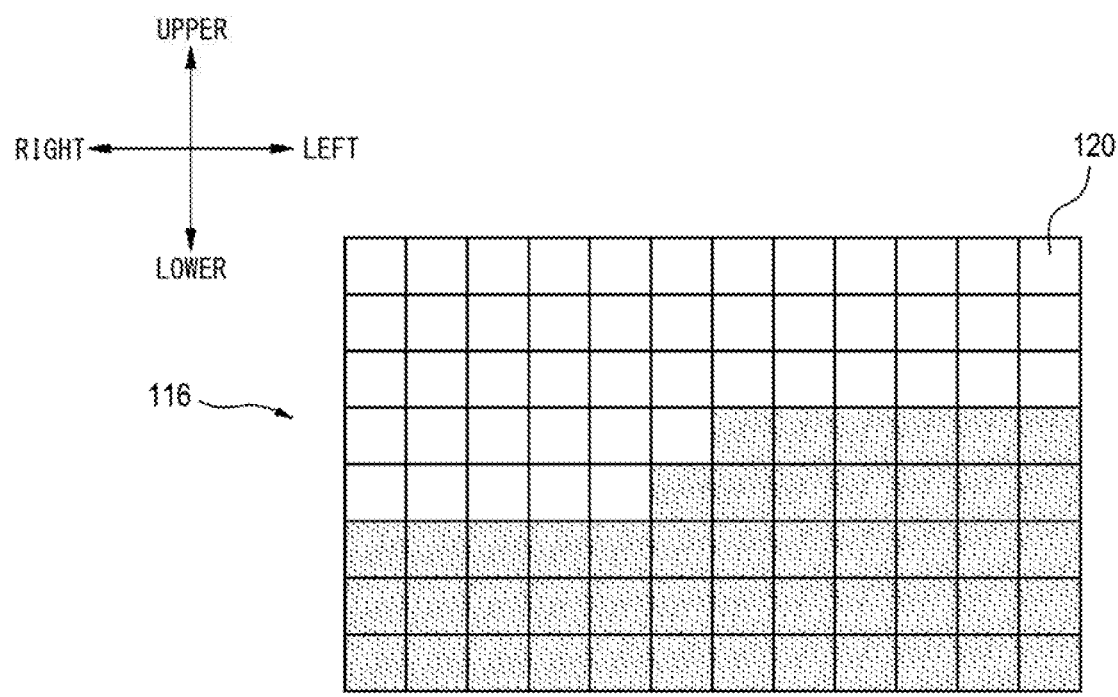
FIG. 16 is a pictorial view depicting lighting regions and lights-out regions of the individual light sources for forming a low beam light distribution pattern.

In the meantime, it is also possible to form a low beam light distribution pattern having a predetermined cutoff line by controlling the lighting/lights-out of the individual light sources 120 of the high beam lamp unit 3 to a lighting/lights-out state as shown in FIG. 16. Also in this case, even when the vehicle body of the automatic two-wheeled vehicle 100 is tilted, the lamp control unit 5 adjusts the lighting/lights-out pattern of the individual light sources 120 so that the cutoff line is maintained along the horizontal direction. Thereby, as with the case in which the low beam lamp unit 2 is used, it is possible to maintain the low beam light distribution pattern at an appropriate angle even upon the bank of the vehicle.

Second Embodiment

Figure 17:
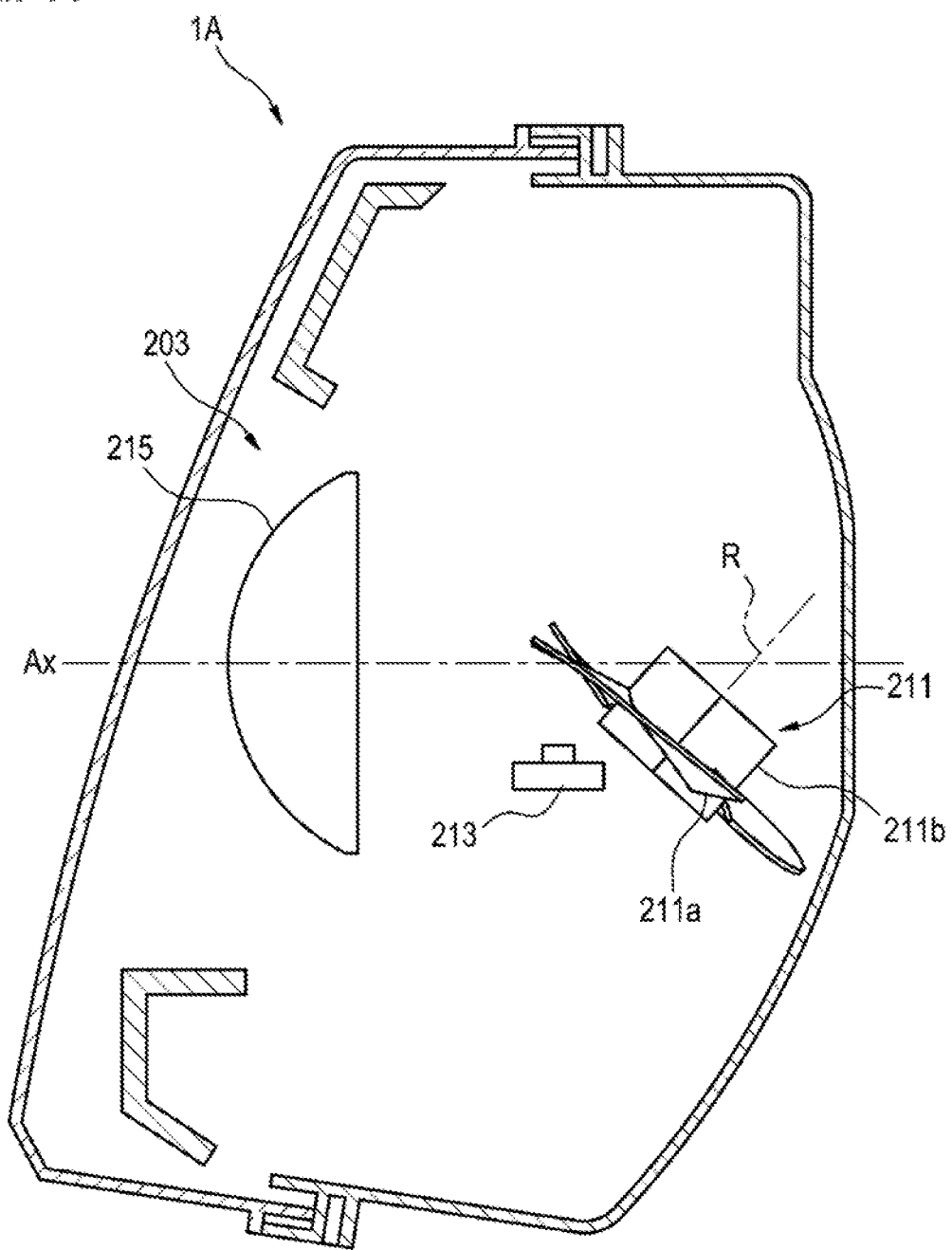
FIG. 17 is a vertical sectional view depicting a configuration of a headlamp in accordance with a second embodiment.

Subsequently, a second embodiment of the vehicle lamp, particularly, the high beam lamp unit is described with reference to FIGS. 17 and 18. In the second embodiment, as shown in FIG. 17, a high beam lamp unit 203 of a headlamp 1A includes a rotary reflector 211 (an example of an optical member), an LED 213 (an example of a light source), and a projector lens 215 disposed in front of the rotary reflector 211. In the meantime, instead of the LED 213, a semiconductor light-emitting element such as an EL element and an LD element can be used as the light source. In particular, for control for shielding a part of a light distribution pattern (which will be described later), a light source capable of performing lighting/lights-out in a short time with accuracy is preferably used. A shape of the projector lens 215 may be appropriately selected according to a required light distribution pattern and a light distribution characteristic such as an illuminance distribution. However, an aspherical lens or a free-form surface lens is used. In the second embodiment, a convex aspherical lens is used as the projector lens 215, for example.

The rotary reflector 211 is configured to rotate in one direction about a rotation axis R by a drive source such as a motor (not shown). Also, the rotary reflector 211 has a reflecting surface configured to reflect light emitted from the LED 213 while rotating, and to form a desired light distribution pattern.

Figure 18:
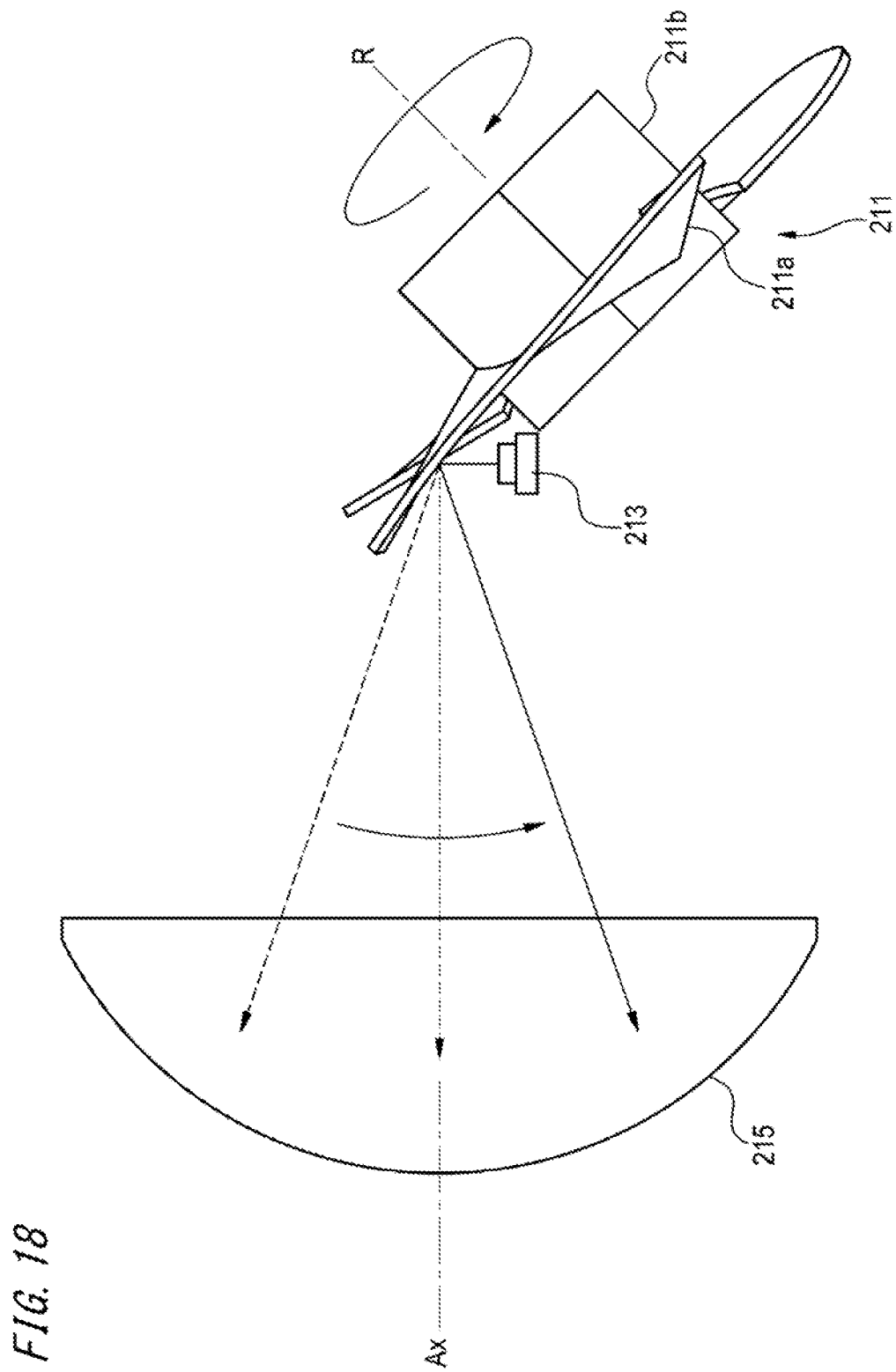
FIG. 18 depicts a configuration of an optical member of a high beam lamp unit of the headlamp shown in FIG. 17.

As shown in FIG. 18, the rotary reflector 211 has three blades 211a having the same shape, and a tubular rotating part 211b. The blades 211a function as the reflecting surface, and are provided around the rotating part 211b. The rotation axis R of the rotary reflector 211 is oblique with respect to the optical axis Ax, and is provided in a plane including the optical axis Ax and the LED 213.

The blade 211a has such a distorted shape that an angle between the optical axis Ax and the reflecting surface changes toward a circumferential direction about the rotation axis R. Thereby, as shown in FIG. 18, the scanning of using the light emitted from the LED 213 is possible. Specifically, the rotary reflector 211 is configured to scan once the front in one direction (horizontal direction) by the light emitted from the LED 213 through rotation of 120°. That is, when one blade 211a passes in front of the LED 213, a desired region ahead of the vehicle is scanned once by the light emitted from the LED 213.

In the high beam lamp unit 203 of the second embodiment, the timing of the lighting/lights-out of the LED 213 and the change in degree of light emission are synchronized with the rotation of the rotary reflector 211, so that it is possible to form a high beam light distribution pattern in which any region (for example, the non-irradiation region PH1 of FIG. 12) is light-shielded, like the high beam light distribution pattern PH shown in FIG. 12.

Also, the high beam lamp unit 203 can perform control of swiveling the high beam light distribution pattern when synchronizing the timing of the lighting/lights-out of the LED 213 with the rotation of the rotary reflector 211. Therefore, even when the vehicle body of the automatic two-wheeled vehicle 100 is tilted, the synchronization processing of the timing of the lighting/lights-out of the LED 213 and the rotation of the rotary reflector 211 is adjusted so that the longitudinal direction of the light distribution pattern is maintained along the horizontal direction. Thereby, as with the first embodiment, the high beam light distribution pattern can be adjusted so that no light is irradiated in a region located outside the high beam light distribution pattern corresponding to when the vehicle body is in the vertical state.

Also, even when the vehicle body is tilted, the high beam light distribution pattern can be adjusted so that the non-irradiation region continues to be arranged in a part corresponding to a region in which there is a target object.

Third Embodiment

Figure 19:
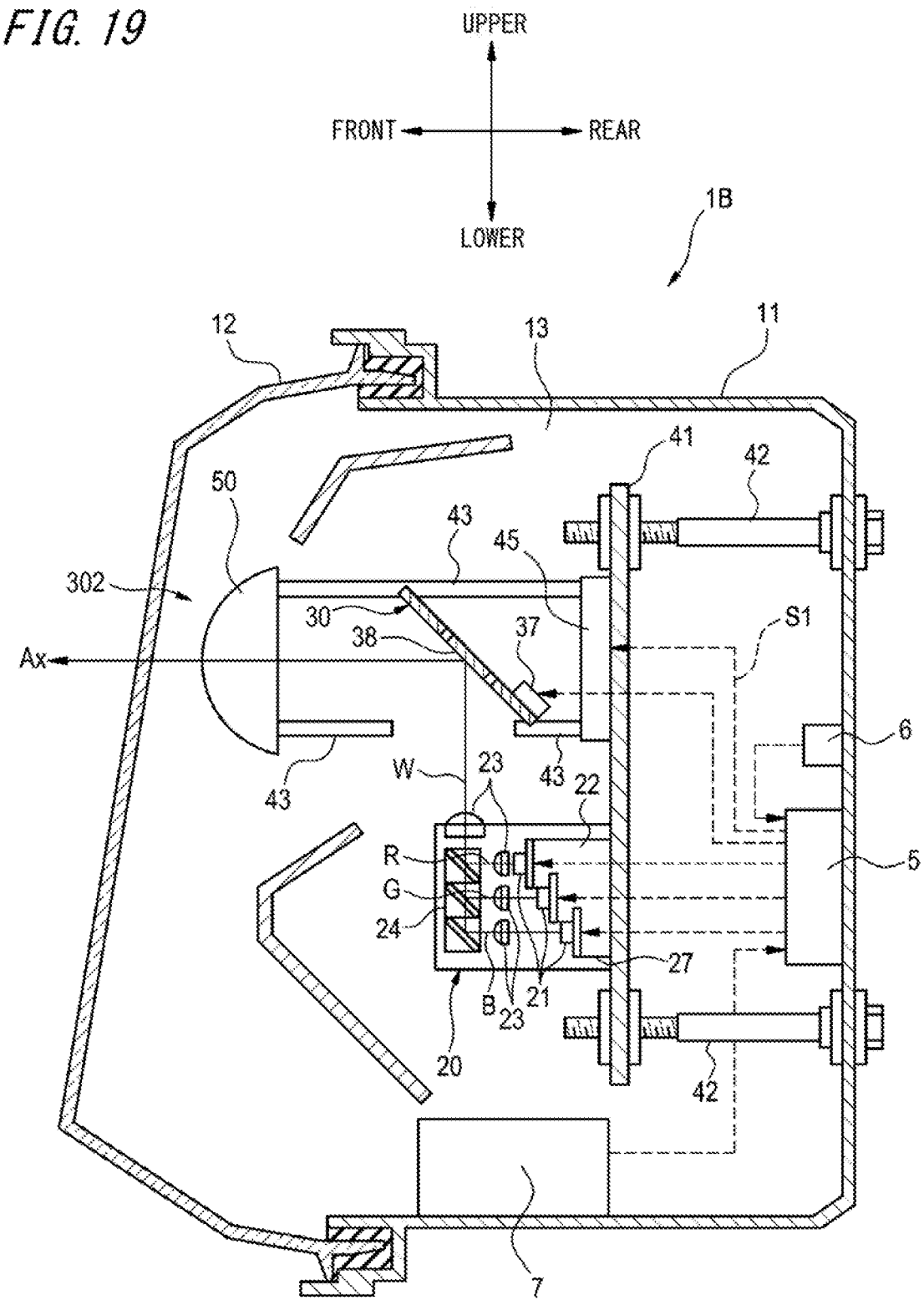
FIG. 19 is a vertical sectional view depicting a configuration of a low beam lamp unit provided to a headlamp in accordance with a third embodiment.
Figure 20:
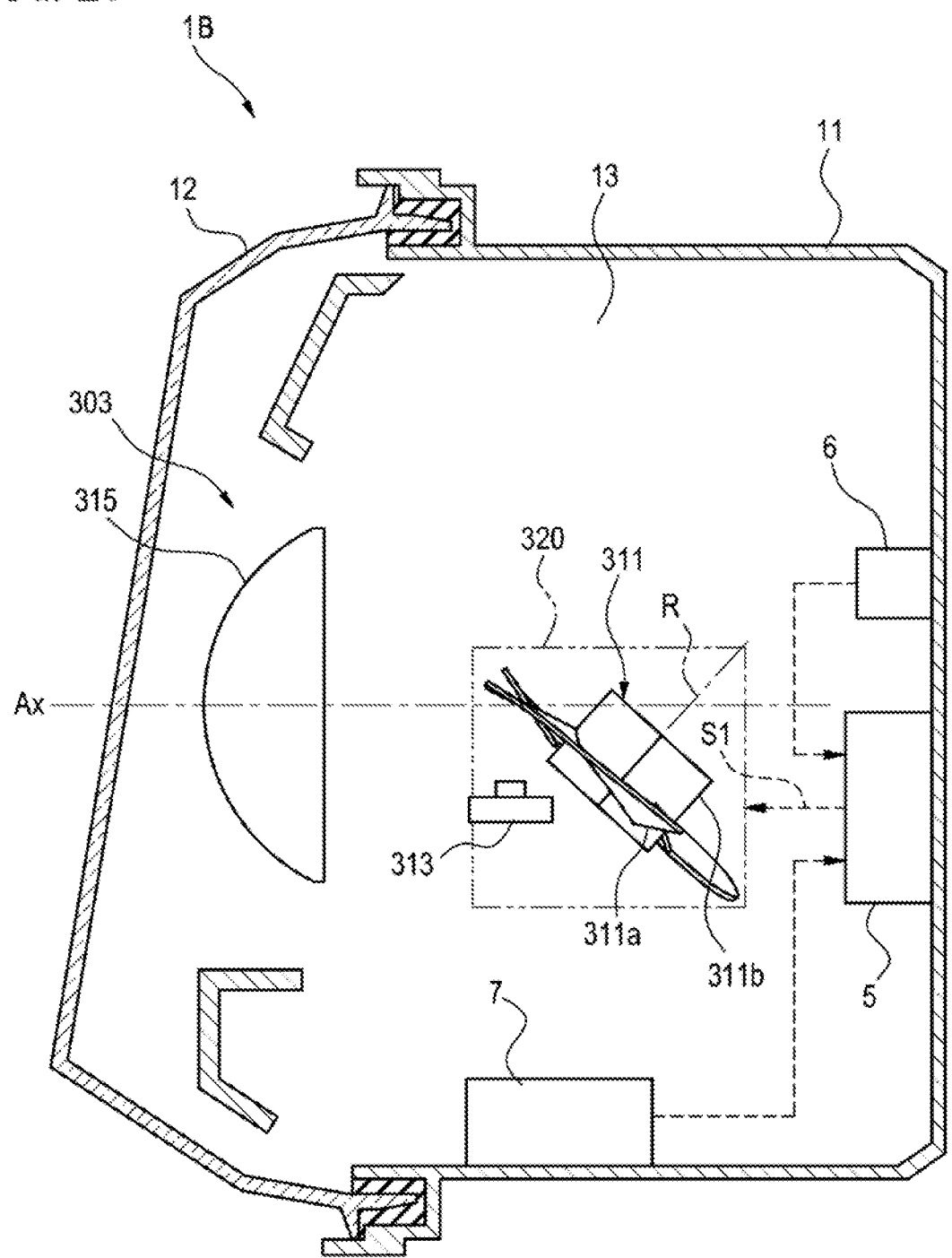
FIG. 20 is a sectional view depicting a configuration of a high beam lamp unit of the headlamp in accordance with the third embodiment.

FIG. 19 is a vertical sectional view depicting a schematic configuration of a low beam lamp unit 302 provided to a headlamp 1B in accordance with a third embodiment. As shown in FIG. 19, the headlamp 1B includes a lamp body 11 having an opening on a front side of the vehicle, and a transparent front cover 12 attached to cover the opening of the lamp body 11. In a lamp chamber 13 formed by the lamp body 11 and the front cover 12, the low beam lamp unit 302, the lamp control unit 5, the bank angle sensor 6, the external sensor (for example LiDAR) 7 and the like are accommodated. In the meantime, although not shown in the sectional view of FIG. 19, a high beam lamp unit 303 is also accommodated in the lamp chamber 13 of the headlamp 1B, like the low beam lamp unit 302, as shown in FIG. 20.

The low beam lamp unit 302 is a so-called projector-type lamp, and includes a light source unit 20, a light distribution unit 30 (an example of an optical member) configured to reflect light from the light source unit 20, and a projector lens 50. The light source unit 20, the light distribution unit 30 and the projector lens 50 are supported in predetermined positions in the lamp chamber 13 by a support plate 41. The support plate 41 is attached to the lamp body 11 via an aiming screw 42.

The light source unit 20 includes a plurality of (three, in the third embodiment) light sources 21, a heat sink 22, a plurality of (four, in the third embodiment) lenses 23, and a light condensing part 24. The light source unit 20 is fixed on a front surface of the support plate 41. Each of the light sources 21 is electrically connected to the lamp control unit 5.

The light distribution unit 30 includes a terminal part 37, and a reflecting mirror 38 (an example of a reflecting body). The light distribution unit 30 is positionally determined with respect to the light source unit 20 so that the laser light emitted from the light source unit 20 can be reflected ahead of the low beam lamp unit 302 via the reflecting mirror 38. The light distribution unit 30 is fixed to a protrusion 43 protruding forward from a front surface of the support plate 41 via an actuator 45 (an example of a correction mechanism), which will be described later. The terminal part 37 is electrically connected to the lamp control unit 5.

The projector lens 50 is a piano-convex aspherical lens of which a front surface is a convex surface and a rear surface is a planar surface, and is disposed on the optical axis Ax extending in the front and rear direction of the vehicle. The projector lens 50 is fixed to a tip end of the protrusion 43 of the support plate 41.

The low beam lamp unit 302 is configured to be able to adjust the optical axis Ax in the horizontal direction and the vertical direction by rotating the aiming screw 42 to adjust a posture of the support plate 41.

The actuator 45 is a device for adjusting postures of the light distribution unit 30 and projector lens 50 of the low beam lamp unit 302. The actuator 45 is configured as a so-called biaxial actuator configured to drive the light distribution unit 30 and the projector lens 50 around two orthogonal axes. The actuator 45 is configured to change the postures of the light distribution unit 30 and the projector lens 5 in a horizontal plane (in a plane including the front and rear direction and the right and left direction) and in a vertical plane (in a plane including the right and left direction and the upper and lower direction). Since the configuration of the biaxial actuator is well known, the detailed description thereof is omitted.

In the meantime, since the angles of the light distribution unit 30 and the projector lens 50 in accordance with the third embodiment have only to be corrected in correspondence to the bank of the automatic two-wheeled vehicle 100, the actuator 45 may be configured as a uniaxial actuator configured to drive the light distribution unit 30 and the projector lens 50 around one axis along the front and rear direction.

The lamp control unit 5 is fixed to the lamp body 11 at the rear of the support plate 41. In the meantime, the position in which the lamp control unit 5 is provided is not limited thereto.

The lamp control unit 5 is configured to acquire, from the bank angle sensor 6, information (hereinbelow, referred to as 'bank angle information') about a tilted angle of the vehicle body of the automatic two-wheeled vehicle 100 detected by the bank angle sensor 6. Specifically, the lamp control unit 5 is configured to generate a bank angle signal S1 based on a signal associated with the bank angle information during the traveling of the automatic two-wheeled vehicle 100, which is output from the bank angle sensor 6, and to input the generated signal to the actuator 45. The bank angle signal S1 has attributes (a voltage value, a current value, a frequency and the like) corresponding to an amount of adjustment of the posture of the automatic two-wheeled vehicle 100 in the vertical plane, which is detected by the bank angle sensor 6.

The actuator 45 is configured to adjust the postures of the light distribution unit 30 and the projector lens 50 in the vertical plane, based on the bank angle signal S1. That is, in the low beam lamp unit 302 of the third embodiment, the adjustment of the postures (tilts in the vertical plane) of the light distribution unit 30 and the projector lens 50 by the actuator 45 is performed on the basis of the detection of the bank angle information by the bank angle sensor 6.

The light source unit 20 and the light distribution unit 30 are positionally determined with respect to each other so that the white laser light W emitted from the light source unit 20 is to be reflected ahead of the low beam lamp unit 302 by the reflecting mirror 38. The light distribution unit 30 is configured to scan the front of the automatic two-wheeled vehicle 100 with the white laser light W by the reciprocal rotation of the reflecting mirror 38. For example, the light distribution unit 30 is configured to scan a region of the low beam light distribution pattern to be formed by the white laser light W, via the projector lens 50. Thereby, the white laser light W is distributed in a formation region of the low beam light distribution pattern, so that a predetermined low beam light distribution pattern is formed ahead of the automatic two-wheeled vehicle 100.

The light distribution unit 30 of the low beam lamp unit 302 in accordance with the third embodiment can scan a rectangular scanning region SA extending in the vehicle width direction by the white laser light W, via the projector lens 50. When the scanning position of the light distribution unit 30 is within the low beam light distribution pattern PL, the lamp control unit 5 controls each of the light sources 21 so as to emit the laser light from each of the light sources 21. On the other hand, when the scanning position of the light distribution unit 30 is outside the low beam light distribution pattern PL, the lamp control unit 5 controls each of the light sources 2 so as to stop the emission of the laser light from each of the light sources 21. Thereby, the low beam light distribution pattern PL having the opposite traffic line-side cutoff line CL1, the host traffic line-side cutoff line CL2 and the oblique cutoff line CL3 is formed.

Subsequently, a method of controlling the low beam light distribution pattern that is to be formed ahead of the lamp by the irradiation of the light from the low beam lamp unit 302 is described with reference to FIGS. 7 to 9, as with the first embodiment.

As shown in FIG. 7, when the automatic two-wheeled vehicle 100 travels in a state in which the vehicle body is upright with respect to a road surface, for example, travels straight on a straight road, the white laser light W irradiated from the low beam lamp unit 302 is irradiated ahead of the lamp as the low beam light distribution pattern PL having such a shape that the opposite traffic line-side cutoff line CL1 and the host traffic line-side cutoff line CL2 are along the horizontal direction H.

In the meantime, as shown in FIG. 8, when the automatic two-wheeled vehicle 100 tilts the vehicle body leftward with respect to the road surface, for example, travels with tilting the vehicle body leftward with respect to the road surface so as to move to the left of the road, in the low beam lamp unit of the related art, the irradiated white laser light W is irradiated ahead of the lamp as a low beam light distribution pattern PL1 having such a shape that the opposite traffic line-side cutoff line CL1 and the host traffic line-side cutoff line CL2 are tilted with respect to the horizontal direction H (tilted according to the tilted state of the automatic two-wheeled vehicle 100). For this reason, an amount of light becomes insufficient and far visibility is lowered on a side in the turning direction, in some cases.

In contrast, according to the low beam lamp unit 302 of the third embodiment, the lamp control unit 5 is configured to correct tilts (angles) of the light distribution unit 30 and the projector lens 50 in the vertical plane by the actuator 45 on the basis of the tilt signal S1 output from the bank angle sensor 6 so that the opposite traffic line-side cutoff line CL1 and the host traffic line-side cutoff line CL2 of the low beam light distribution pattern PL are maintained along the horizontal direction H.

Specifically, when the automatic two-wheeled vehicle 100 travels with tilting the vehicle body leftward, for example, the lamp control unit 5 transmits the tilt signal S1 to the actuator 45, and controls the actuator 45 so as to tilt the light distribution unit 30 and the projector lens 50 in an opposite direction (for example, a right side) to the tilted direction of the automatic two-wheeled vehicle 100. Thereby, as shown in FIG. 9, even when the automatic two-wheeled vehicle 100 travels with tilting the vehicle body leftward or rightward, the irradiated white laser light W is irradiated ahead of the lamp as the low beam light distribution pattern PL2 having such a shape that the opposite traffic line-side cutoff line CL1 and the host traffic line-side cutoff line CL2 are along the horizontal direction H. In this way, even when the automatic two-wheeled vehicle 100 travels with the vehicle body being tilted, the angles of the light distribution unit 30 and the projector lens 50 are corrected by the actuator 45, so that the low beam light distribution pattern PL2, which has a shape corresponding to a shape of the low beam light distribution pattern PL (refer to FIG. 7) formed ahead of the lamp in a state (the vertical state) in which the vehicle body is not tilted, can be maintained.

As described above, the headlamp 1B having the low beam lamp unit 302 in accordance with the third embodiment includes the light source unit 20 (the light source 21), the light distribution unit 30 and projector lens 50 configured to form a predetermined light distribution pattern by irradiating the light from the light source 21 toward a region ahead of the lamp, and the actuator 45 configured to correct the angles of the light distribution unit 30 and the projector lens 50 according to the tilted state of the automatic two-wheeled vehicle 100. Thereby, even upon the bank of the vehicle body of the automatic two-wheeled vehicle 100, the low beam light distribution pattern PL2 can be maintained at the appropriate angle. For this reason, for example, it is possible to contribute to improvement on safety in assisting the driving.

In the meantime, it is also considered to control the light scanning direction in correspondence to the tilt angle of the automatic two-wheeled vehicle 100 by the light distribution unit 30, thereby correcting the irradiation angle of the low beam light distribution pattern PL. However, when the configuration of the third embodiment is adopted, it is not necessary to control the scanning processing of the light distribution unit 30 in correspondence to the tilt angle of the automatic two-wheeled vehicle 100, so that the control can be easily performed.

In the third embodiment, the actuator 45 is configured to rotate the light distribution unit 30 and the projector lens 50 in the vertical plane, (in the opposite direction to the tilt angle) in correspondence to the tilt angle of the automatic two-wheeled vehicle 100. Thereby, it is not necessary to provide an additional reflecting mirror for changing the low beam light distribution pattern PL and an additional lamp for forming an additional light distribution pattern to complement the low beam light distribution pattern PL, so that it is possible to downsize the vehicle lamp and to reduce the number of components.

Meanwhile, in the third embodiment, the projector lens 50 is configured to rotate together with the light distribution unit 30. However, the present disclosure is not limited thereto. For example, the projector lens 50 may be fixedly maintained in the lamp chamber 13, and only the light distribution unit 30 may be rotated by the actuator 45.

Also, the low beam lamp unit 302 may have a correction mechanism for correcting positions of the light distribution unit 30 and the projector lens 50, as an alternative to the actuator 45 configured to rotate the light distribution unit 30 and the projector lens 50 in the vertical plane. The correction mechanism may be configured to change relative positions of the light distribution unit 30 and the projector lens 50, for example. Herein, the description "to change relative positions" includes changing relative positions of the light distribution unit 30 and the projector lens 50 in the vertical plane including the right and left direction and the upper and lower direction. For example, the relative positions of the light distribution unit 30 and the projector lens 50 may be changed so that, when the automatic two-wheeled vehicle 100 is tilted leftward or rightward, the light reflected on the light distribution unit 30 is to be mainly incident on the lower side of the projector lens 50. For example, the light distribution unit 30 is moved downward with respect to the fixed projector lens 50. Thereby, the low beam light distribution pattern may be formed on an upper side of the low beam light distribution pattern PL1 shown in FIG. 8. According to this configuration, the sufficient amount of light can be maintained on a side toward which the automatic two-wheeled vehicle 100 turns, and the lowing in far visibility can be prevented.

Subsequently, the configuration of the high beam lamp unit 303 of the headlamp 1B is described with reference to FIGS. 20 and 21.

The high beam lamp unit 303 is a so-called projector-type lamp, and includes a rotary reflector 311 (an example of an optical member), an LED 313 (an example of a light source), a projector lens 315 (an example of an optical member) disposed in front of the rotary reflector 311, and an actuator 320. In the meantime, instead of the LED 313, a semiconductor light-emitting element such as an EL element and an LD element can be used as the light source. In particular, for control for shielding a part of a light distribution pattern (which will be described later), a light source capable of performing lighting/lights-out in a short time with accuracy is preferably used. A shape of the projector lens 315 may be appropriately selected according to a required light distribution pattern and a light distribution characteristic such as an illuminance distribution. However, an aspherical lens or a free-form surface lens is used. In the third embodiment, a convex aspherical lens is used as the projector lens 315, for example.

Although the description of the specific configuration is omitted, the actuator 320 is a device for adjusting a posture (particularly, a posture in the vertical plane) of the rotary reflector 311, like the actuator 45 of the low beam lamp unit 302.

The rotary reflector 311 is configured to rotate in one direction about the rotation axis R by a drive source such as a motor (not shown). Also, the rotary reflector 311 has a reflecting surface configured to reflect light emitted from the LED 313 while rotating, and to form a desired light distribution pattern.

Figure 21:
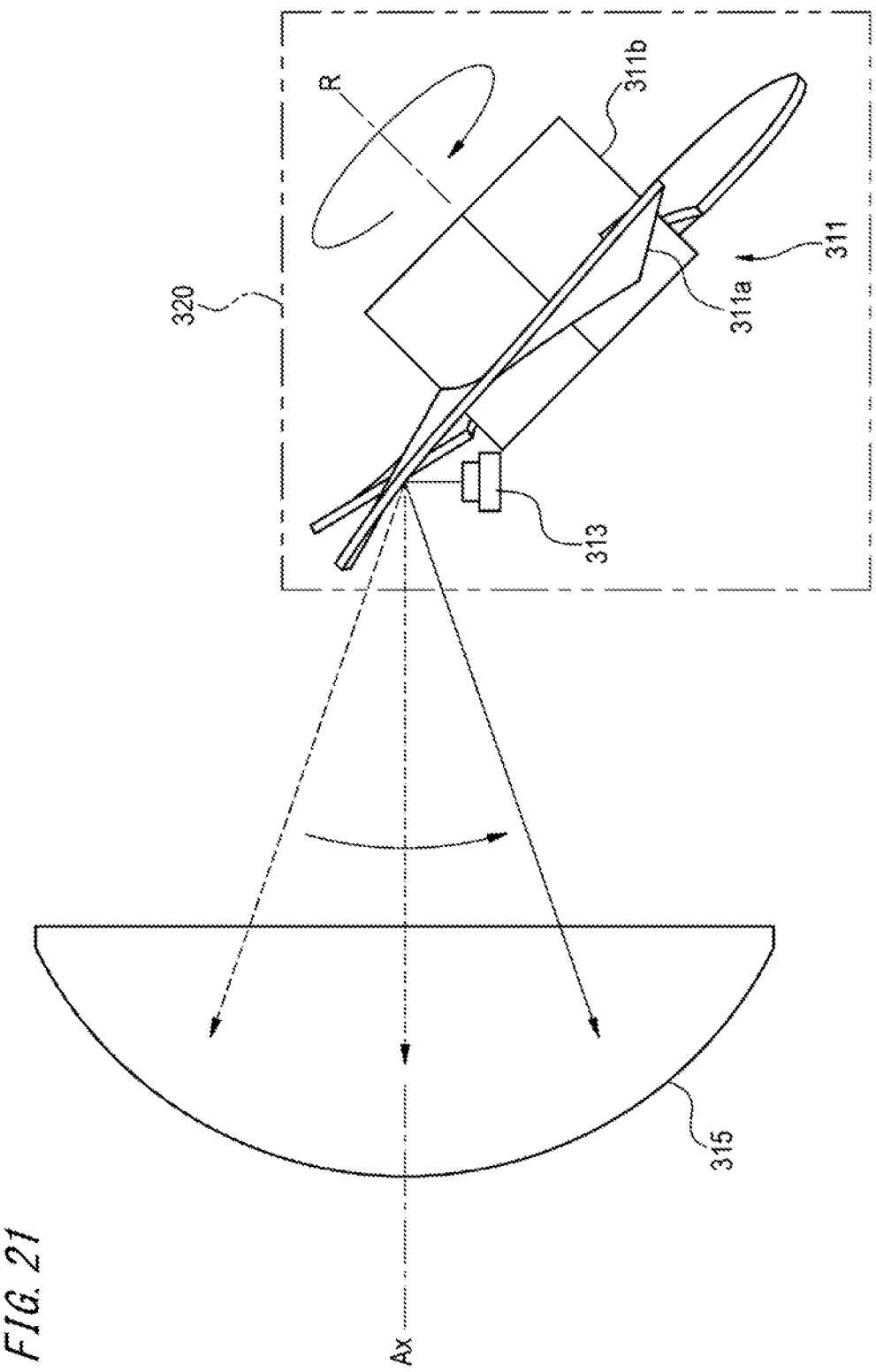
FIG. 21 is a perspective view depicting a configuration of an optical member of the high beam lamp unit shown in FIG. 20.

As shown in FIG. 21, the rotary reflector 311 has three blades 311a having the same shape, and a tubular rotating part 311b. The blades 311a function as the reflecting surface, and are provided around the rotating part 311b. The rotation axis R of the rotary reflector 311 is oblique with respect to the optical axis Ax, and is provided in a plane including the optical axis Ax and the LED 313.

The blade 311a has such a distorted shape that an angle between the optical axis Ax and the reflecting surface changes toward a circumferential direction about the rotation axis R. Thereby, as shown in FIG. 21, the scanning of using the light emitted from the LED 313 is possible. Specifically, the rotary reflector 311 is configured to scan once the front in one direction (horizontal direction) by the light emitted from the LED 313 through rotation of 120°. That is, when one blade 311a passes in front of the LED 313, a desired region ahead of the vehicle is scanned once by the light emitted from the LED 313.

The lamp control unit 5 is configured to generate a bank angle signal S1 based on a signal associated with the bank angle information during the traveling of the automatic two-wheeled vehicle 100, which is output from the bank angle sensor 6, and to input the generated signal to the actuator 320. The actuator 320 is configured to adjust a posture of the rotary reflector 311 in the vertical plane, based on the bank angle signal S1. That is, in the high beam lamp unit 303 of the third embodiment, the adjustment of the posture (tilt in the vertical plane) of the rotary reflector 311 by the actuator 320 is performed on the basis of the detection of the bank angle information by the bank angle sensor 6.

Figure 22:
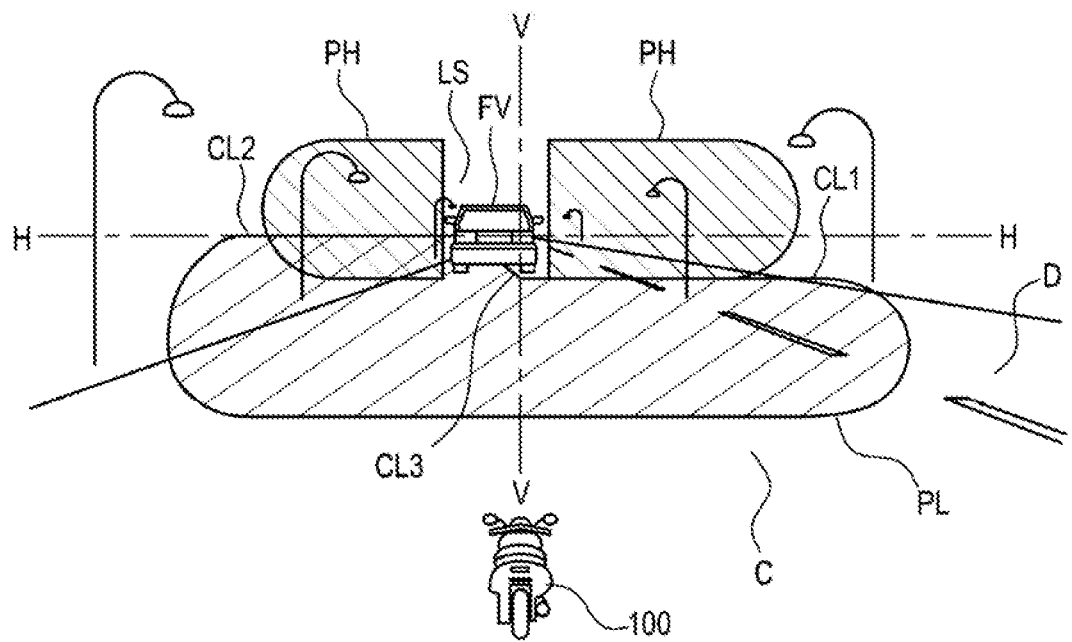
FIG. 22 illustrates a high beam light distribution pattern to be formed by the high beam lamp unit shown in FIG. 20.

FIG. 22 pictorially depicts a low beam light distribution pattern and a high beam light distribution pattern to be formed by the vehicle lamp. FIG. 12 depicts the light distribution patterns formed on a virtual vertical screen arranged in a predetermined position ahead of the lamp, for example, in a position 25 m ahead of the lamp.

In the headlamp 1B of the third embodiment, a high beam light distribution pattern PH is formed by the irradiation light from the high beam lamp unit 303. The high beam light distribution pattern PH is a light distribution pattern formed additionally to the low beam light distribution pattern PL. The high beam light distribution pattern PH is added to the low beam light distribution pattern PL so that an irradiation region is to be formed at least above the opposite traffic line-side cutoff line CL1 of the low beam light distribution pattern PL.

Subsequently, the ADB mode that is to be executed by the lamp control unit 5 in accordance with the third embodiment is described in detail.

When the lamp control unit 5 acquires the information from the external sensor 7 and/or the speed sensor 8, the lamp control unit synchronizes the timing of the lighting/lights-out of the LED 313 and the change in degree of light emission with the rotation of the rotary reflector 311, based on the information input from the outside. Thereby, as shown in FIG. 22, a high beam light distribution pattern PH in the ADB mode in which any region (for example, a non-irradiation region LS in FIG. 22) is set as a non-irradiation region can be formed. Specifically, the lamp control unit 5 controls operations of the LED 313 and the rotary reflector 311 so as not to irradiate a region, in which there is a target object such as a preceding vehicle (for example, the preceding traveling vehicle FV). In the meantime, the "non-irradiation region LS" may include a region in which light is to be irradiated with a low illuminance at which the glare is not to be provided to a driver of the preceding vehicle.

Figure 23:
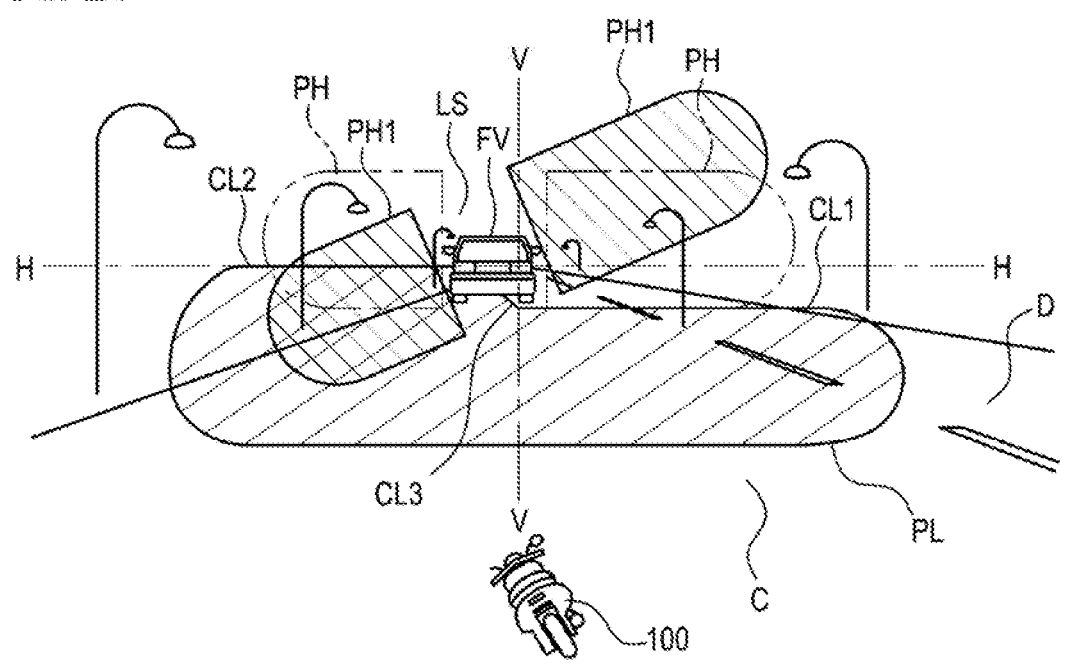
FIG. 23 illustrates a high beam light distribution pattern.

In the meantime, as shown in FIG. 23, in a case in which the automatic two-wheeled vehicle 100 tilts the vehicle body leftward with respect to the road surface, for example, travels with tilting the vehicle body leftward so as to move to the left of the road, if the angle of the rotary reflector 311 is fixed, the light irradiated from the high beam lamp unit 303 is formed ahead of the lamp, as a high beam light distribution pattern PH1 tilted with respect to the horizontal direction H according to the tilted state of the automatic two-wheeled vehicle 100. For this reason, an amount of light becomes insufficient and far visibility is lowered in a region in front of the automatic two-wheeled vehicle 100, particularly, on a side in the turning direction of the automatic two-wheeled vehicle 100, in some cases. Also, at least a part of the region in which there is the preceding traveling vehicle FV deviates from the non-irradiation region LS (i.e., is included in the irradiation region), so that the glare may be provided to the driver of the preceding traveling vehicle FV.

Figure 24:
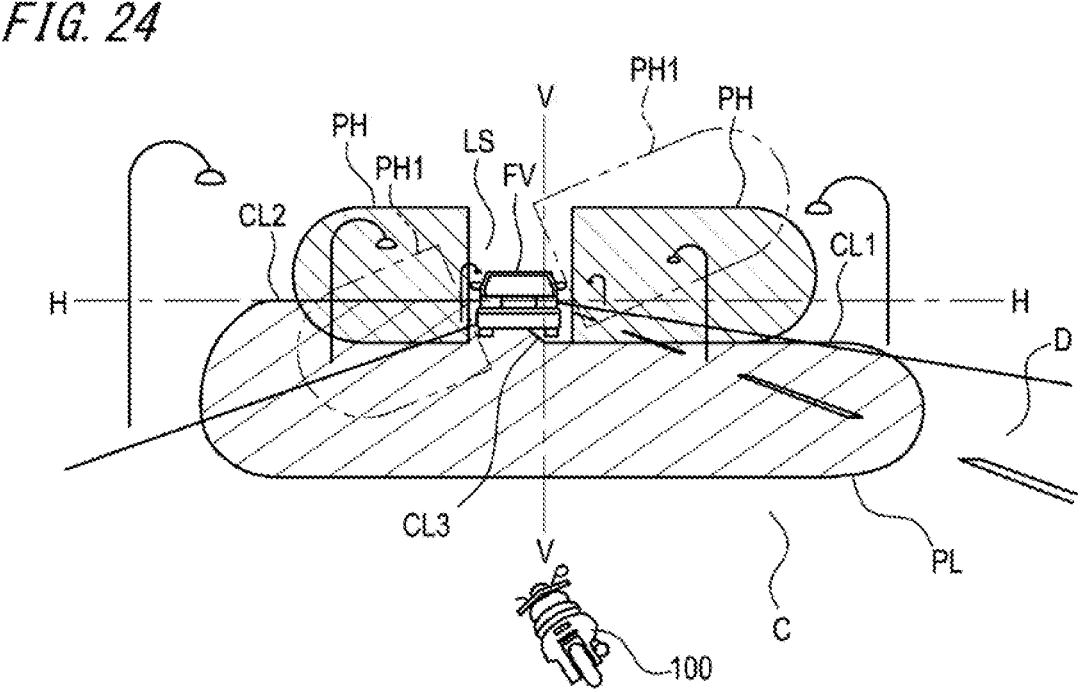
FIG. 24 illustrates a high beam light distribution pattern.

In contrast, according to the headlamp 1B of the third embodiment, the lamp control unit 5 is configured to correct the angle in the vertical plane of the rotary reflector 311 by the actuator 320. For example, even when the automatic two-wheeled vehicle 100 travels with tilting the vehicle body, as described above, the lamp control unit 5 corrects the angle of the rotary reflector 311 so that a light distribution pattern having such a shape that a longitudinal direction of the high beam light distribution pattern PH is substantially along the horizontal direction H is to be formed ahead of the lamp, as shown in FIG. 24. That is, when the automatic two-wheeled vehicle 100 travels with tilting the vehicle body leftward, for example, the lamp control unit 5 transmits the tilt signal S1 to the actuator 320, and controls the actuator 320 so as to tilt the rotary reflector 311 in the opposite direction (for example, the right side) to the tilting direction of the automatic two-wheeled vehicle 100.

As described above, the headlamp 1B having the high beam lamp unit 303 in accordance with the third embodiment includes the LED 313, the rotary reflector 311 and projector lens 315 configured to form the high beam light distribution pattern PH by irradiating the light emitted from the LED 313 toward the region ahead of the lamp, and the actuator 320 configured to correct the angle of the rotary reflector 311. For this reason, even when the automatic two-wheeled vehicle 100 travels with being tilted leftward or rightward, the angle of the rotary reflector 311 is corrected by the actuator 320, so that the appropriate high beam light distribution pattern PH can be formed. Thereby, for example, it is possible to contribute to improvement on safety in assisting the driving.

In the meantime, it is also considered to control the synchronization processing of the lighting/lights-out of the LED 313 and the scanning by the rotary reflector 311 in correspondence to the tilt angle of the automatic two-wheeled vehicle 100, thereby correcting the irradiation angle of the high beam light distribution pattern PH. However, when the configuration of the third embodiment is adopted, it is not necessary to control the synchronization processing of the LED 313 and the rotary reflector 311 in correspondence to the tilt angle of the automatic two-wheeled vehicle 100, so that the control can be easily performed.

Also, the lamp control unit 5 is configured to correct the angle of the rotary reflector 311 by the actuator 320. Therefore, even when the vehicle body of the automatic two-wheeled vehicle 100 is tilted, the high beam light distribution pattern PH can be formed so that the non-irradiation region LS continues to be arranged in a part corresponding to a position in which there is the preceding vehicle such as the preceding traveling vehicle FV. Thereby, even upon the bank of the vehicle, the non-irradiation region LS of the high beam light distribution pattern PH can be maintained as appropriate, so that it is possible to prevent the glare to the drivers of the preceding traveling vehicle FV and the oncoming vehicle.

Also, the high beam lamp unit 303 may have a correction mechanism for correcting relative positions of the rotary reflector 311 and the projector lens 315, as an alternative to the actuator 320 configured to correct the angle of the rotary reflector 311. The correction mechanism changes the relative positions of the light distribution unit and the projector lens (for example, moves the rotary reflector downward with respect to the fixed projector lens) so that, when the automatic two-wheeled vehicle 100 is tilted leftward or rightward, for example, the light reflected on the rotary reflector is to be mainly incident on the lower side of the projector lens. Thereby, the high beam light distribution pattern can be formed on the upper side of the high beam light distribution pattern PH1 shown in FIG. 23. By this configuration, the sufficient amount of light can be maintained on a side toward which the automatic two-wheeled vehicle 100 turns, and the lowing in far visibility can be prevented.

Although the embodiments of the present invention have been described, the technical scope of the present invention is not construed as being limited to the description of the present embodiments. It can be understood by one skilled in the art that the present embodiments are just exemplary and can be diversely changed within the scope of the invention defined in the claims. The technical scope of the present invention should be determined on the basis of the scope of the invention defined in the claims and the equivalents thereof.

In the embodiments, the lamp control unit 5, the bank angle sensor 6 and the external sensor 7 are accommodated in the lamp chamber of the headlamp. However, the present invention is not limited thereto. For example, the lamp control unit 5, the bank angle sensor 6 and the external sensor 7 may be disposed as separate members from the headlamp.

Also, in the low beam lamp unit 2 of the first embodiment, a projector lens, which is similar to that of the low beam lamp unit 302 of the third embodiment, may be provided in front of the light distribution unit 30.

The subject application is based on Japanese Patent Application Nos. 2017-161187 filed on August 24 and 2017-161188 filed on Aug. 24, 2017, the contents of which are incorporated herein by reference.

The invention claimed is:

1. A vehicle lamp provided on a vehicle capable of traveling around a corner by tilting a vehicle body toward a turning direction, the vehicle lamp comprising:
   a high beam light source comprising a plurality of individual light-emitting elements;
   a low beam light source;
   a first optical member configured to form a high beam predetermined light distribution pattern by irradiating light, which is to be emitted from the plurality of individual light emitting elements, toward a region ahead of the vehicle lamp;
   a second movable optical member configured to form a low beam predetermined light distribution pattern by irradiating light, which is to be emitted from the low beam light source, towards the region ahead of the vehicle lamp; and
   a control unit configured to adjust the high beam predetermined light distribution pattern and the low beam predetermined light distribution pattern according to a tilted state of the vehicle body,
   wherein the control unit is configured to adjust the high beam predetermined light distribution pattern and the low beam predetermined light distribution pattern so that in a light distribution pattern corresponding to when the vehicle body is tilted, no light is irradiated in a region located outside a light distribution pattern corresponding to when the vehicle body is in a vertical state;
   wherein the high beam light distribution pattern corresponding to when the vehicle body is tilted is adjusted by the control unit by turning on and off the plurality of individual light emitting elements.

2. The vehicle lamp according to claim 1, wherein the low beam light distribution pattern has a cutoff line, and
   wherein the control unit is configured to adjust the low beam light distribution pattern so that the cutoff line is to be maintained in a horizontal direction even when the vehicle body is tilted.

3. The vehicle lamp according to claim 1, wherein the high beam light distribution pattern comprises a non-irradiation region in which the light is not irradiated to a part corresponding to a target object around the vehicle, and
   wherein the control unit is configured to adjust the high beam light distribution pattern so that the non-irradiation region continues to be arranged in the part corresponding to the target object even when the vehicle body is tilted.

4. The vehicle lamp according to claim 1, wherein the second optical member is configured by at least one of a rotary reflector, a Galvano mirror, a MEMS mirror, and a polygon mirror, and
   wherein the control unit is configured to adjust the low beam predetermined light distribution pattern by controlling a scanning direction of the light with at least one of the rotary reflector, the Galvano mirror, the MEMS mirror, and the polygon mirror.

5. The vehicle lamp according to one of claim 1, further comprising a sensor for detecting the tilted state of the vehicle body.

6. A vehicle lamp provided on a vehicle capable of traveling around a corner by tilting a vehicle body toward a turning direction, the vehicle lamp comprising:
   a high beam light source comprising a plurality of individual light-emitting elements that are turned on and off based on a tilted state of the vehicle;
   a low beam light source;
   a first optical member configured to form a high beam predetermined light distribution pattern by irradiating light, which is to be emitted from the plurality of individual light-emitting elements, toward a region ahead of the vehicle lamp;
   a second optical member configured to form a low beam predetermined light distribution pattern by irradiating light, which is to be emitted from the low beam light source, towards the region ahead of the vehicle lamp; and
   a correction mechanism configured to correct at least one of an angle and a position of the second optical member to a tilted state of the vehicle body,
   wherein the second optical member comprises at least a projector lens and a reflecting body, and
   wherein the reflecting body includes a reflecting surface that reflects light emitted from the light source toward the projector lens without letting the light enter the inside of the reflecting body.

7. The vehicle lamp according to claim 6, wherein the low beam light distribution pattern has a cutoff line
   wherein the correction mechanism is configured to correct the angle of the second optical member so that, even when the vehicle is tilted, a longitudinal direction of the cutoff line of the low beam light distribution pattern is to be maintained along a horizontal direction, and/or
   to correct the high beam light distribution pattern to be maintained along a horizontal direction.

8. The vehicle lamp according to claim 6, wherein the correction mechanism is configured to correct the angle by rotating at least one of the projector lens and the reflecting body.

9. The vehicle lamp according to claim 6, wherein the correction mechanism is configured to correct the position by changing relative positions of the projector lens and the reflecting body.

10. The vehicle lamp according to claim 8, wherein the reflecting body is configured by at least one of a rotary reflector, a Galvano mirror, a MEMS mirror, and a polygon mirror.

11. The vehicle lamp according to claim 6, further comprising a sensor for detecting the tilted state of the vehicle body.

12. The vehicle lamp according to claim 9, wherein the reflecting body is configured by at least one of a rotary reflector, a Galvano mirror, a MEMS mirror, and a polygon mirror.

* * * * *